US012585987B2

(12) United States Patent
Au et al.

(10) Patent No.: US 12,585,987 B2
(45) Date of Patent: Mar. 24, 2026

(54) REMOTE STATISTICAL GENERATION OF GRAPHS FOR GRAPH MACHINE LEARNING

(71) Applicant: FUJITSU LIMITED, Kanagawa (JP)

(72) Inventors: Wing Yee Au, Saratoga, CA (US); Kanji Uchino, Santa Clara, CA (US)

(73) Assignee: Fujitsu Limited, Kawasaki (JP)

( * ) Notice: Subject to any disclaimer, the term of this patent is extended or adjusted under 35 U.S.C. 154(b) by 981 days.

(21) Appl. No.: 17/663,856

(22) Filed: May 18, 2022

(65) Prior Publication Data

US 2023/0376826 A1 Nov. 23, 2023

(51) Int. Cl.
*G06F 16/21* (2019.01)
*G06F 16/901* (2019.01)
*G06N 20/00* (2019.01)

(52) U.S. Cl.
CPC .......... *G06N 20/00* (2019.01); *G06F 16/211* (2019.01); *G06F 16/9024* (2019.01)

(58) Field of Classification Search
CPC .... G06N 20/00; G06F 16/211; G06F 16/9024
USPC ........................................ 707/798
See application file for complete search history.

(56) References Cited

U.S. PATENT DOCUMENTS

| | | | |
|---|---|---|---|
| 12,387,132 B1 * | 8/2025 | Tong ................... | G06F 16/9024 |
| 2019/0266528 A1 * | 8/2019 | Cheng .................. | G06T 11/206 |

| | | | |
|---|---|---|---|
| 2022/0070266 A1 * | 3/2022 | Rossi ..................... | G06F 17/18 |
| 2022/0086279 A1 * | 3/2022 | Skinner ............... | H04M 3/5175 |
| 2023/0045347 A1 * | 2/2023 | Grady ..................... | G06N 5/02 |
| 2023/0214754 A1 * | 7/2023 | Eidelman ......... | G06Q 10/06375 |
| | | | 705/7.37 |
| 2025/0284929 A1 * | 9/2025 | Au ......................... | G06N 20/00 |

OTHER PUBLICATIONS

Sala, Alessandra et al., "Sharing Graphs using Differentially Private Graph Models", Proceedings of the 2011 ACM SIGCOMM on Internet Measurement Conference, Nov. 2-4m 2011, pp. 81-97, XP055666534.

(Continued)

*Primary Examiner* — Joshua Bullock
(74) *Attorney, Agent, or Firm* — Fujitsu Intellectual Property Center

(57) ABSTRACT

According to an aspect of an embodiment, operations may include retrieving a first graph. The operations may further include identifying a set of node-types, determining a first count of each of the identified set of node-types, and determining first statistical information. The operations may further include identifying a set of edge-types, determining a second count of each of the identified set of edge-types and determining a two-dimensional (2D) distribution of each of the identified set of edge-types. The operations may further include determining second statistical information, identifying a set of combinations of edge-types connecting three node-types and determining a third count of each of a set of three node-type groups. The operations may further include determining a three-dimensional (3D) distribution of each of the set of three node-type groups, determining third statistical information, and transmitting first graph statistics associated with the retrieved first graph for generation a second graph.

22 Claims, 20 Drawing Sheets

Determine third statistical information associated with retrieved first graph, based on determined third count and determined 3D distribution 626

Transmit, to second electronic device, first graph statistics associated with retrieved first graph, where transmitted first graph statistics includes determined first statistical information, determined second statistical information, and determined third statistical information 628

Generate, by second electronic device, second graph representative of retrieved first graph based on transmitted first graph statistics 630

(56) References Cited

OTHER PUBLICATIONS

Imola, Jacob et al., "Locally Differentially Private Analysis of Graph Statistics", USENIX, The Advanced Computing Systems Association, Apr. 2, 2021, 18 pages, retrieved from the Internet: URL:http://www.usenix.org/system/files/sec21fall-imola.pdf [retrieved on Apr. 2, 2021], XP061063223.

Extended European Search Report dated Oct. 16, 2023 for corresponding European Patent Application No. 23151075.1, 11 pages.

Informatica Dynamic Data Masking Preventing Data Breaches with Benchmark-Proven Performance, Informatica Whitepaper 2012.

Data Masking with the Delphix DataOps Platform, Delphix Whitepaper 2020.

NIST Communications Technology Laboratory—Differential Privacy Synthetic Data Challenge, National Institute of Standards and Technology Website 2018 (obtained from website https://www.nist.gov/ctl/pscr/open-innovation-prize-challenges/past-prize-challenges/2018-differential-privacy-synthetic).

Winning the NIST Contest: a Scalable and General Approach to Differentially Private Synthetic Data, The University of Massachusetts, Amherst Paper, 2018.

Synthetic Reality: Synthetic Market Data Generation at Scale using Agent Based Modeling, Simudyne & Refinitv Whitepaper 2019.

DIG: A Turnkey Library for Diving into Graph Deep Learning Research, Texas A&M University Paper, 2021.

Snorkel: Rapid Training Data Creation with Weak Supervision, Stanford University Paper, 2017.

* cited by examiner

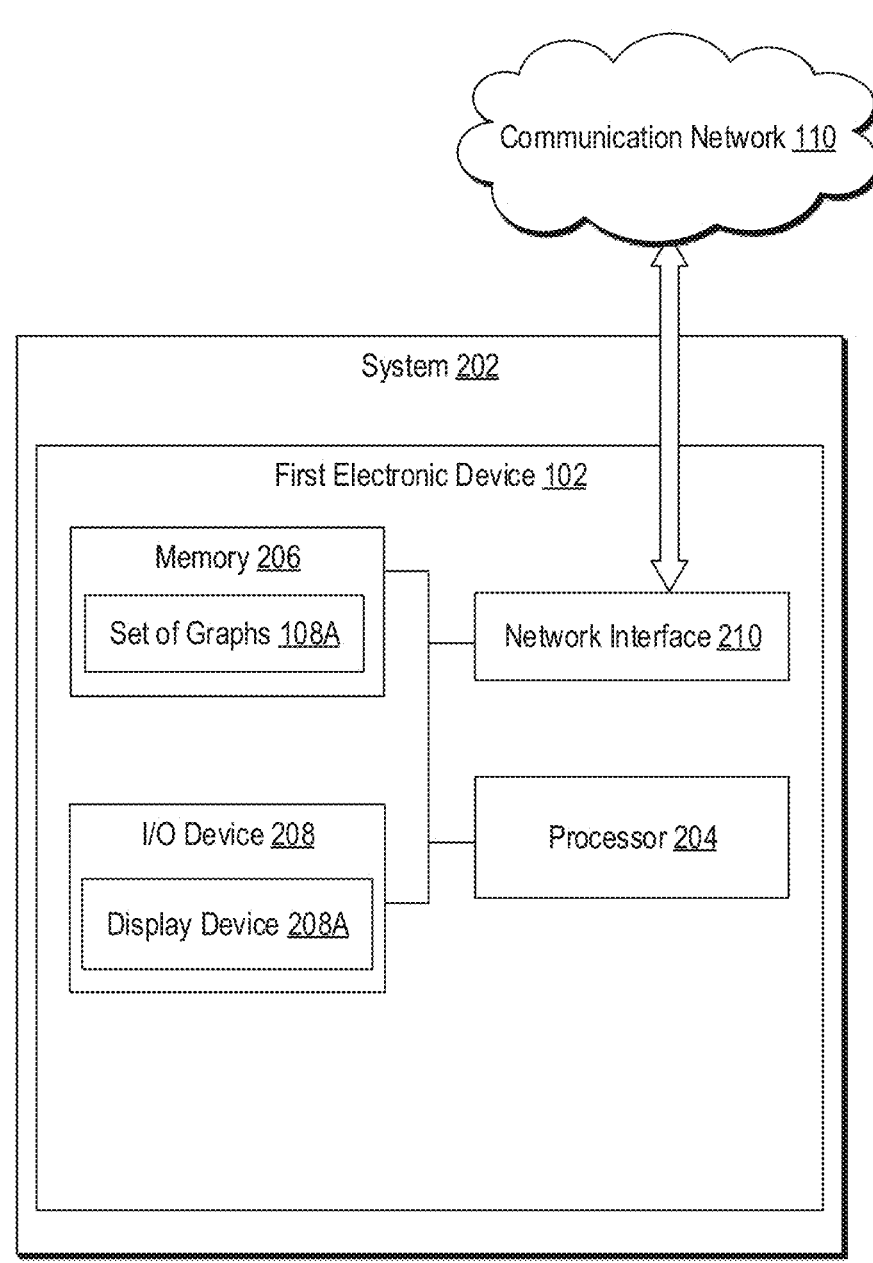
*FIG. 2*

300
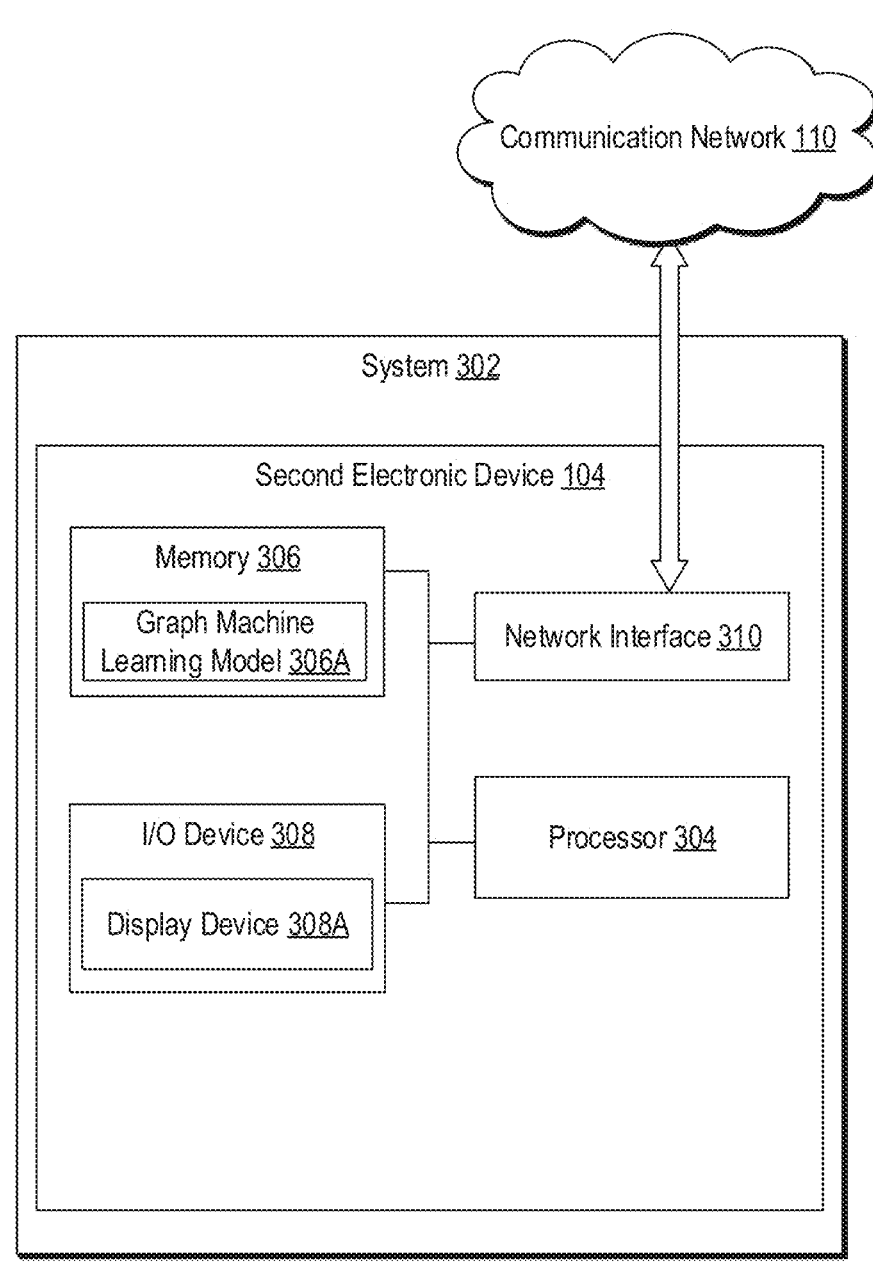
FIG. 3

400

Second Electronic Device 104

Graph Statistics 406

Graph Generator 408

Discovery Agent 412

Graph Network 410

Graph Statistics 414

Statistics Verifier 416

Good Match? 418

Reevaluate Statistics and Generation 420

No

Yes

Graph Extraction

Second Set of Graphs 422

Artificially Generated Data

Label Scores 424

Graph Scoring

Graph Machine Learning 426

Predictive Model 428

A

B

C

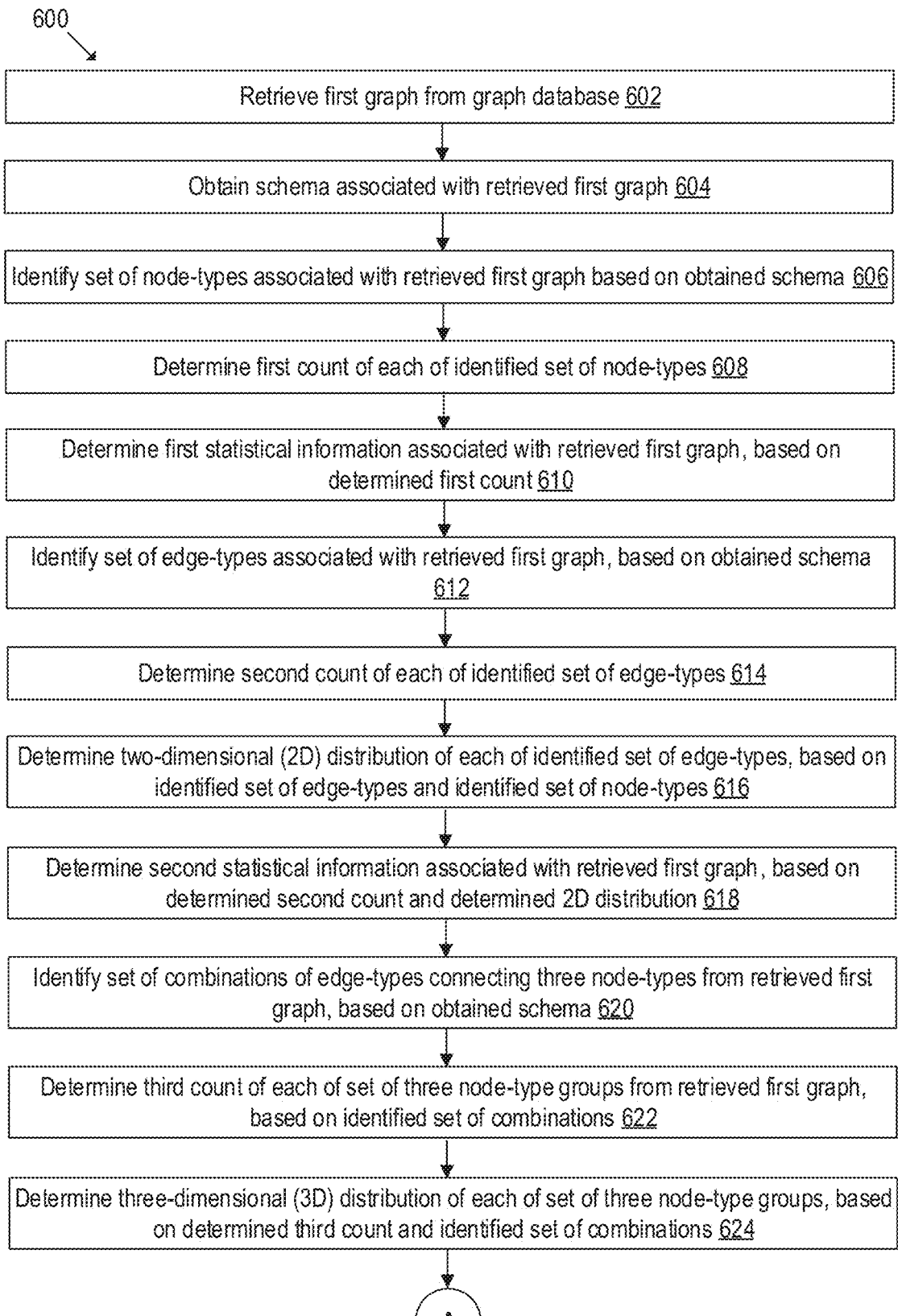

600

Retrieve first graph from graph database 602

Obtain schema associated with retrieved first graph 604

Identify set of node-types associated with retrieved first graph based on obtained schema 606

Determine first count of each of identified set of node-types 608

Determine first statistical information associated with retrieved first graph, based on determined first count 610

Identify set of edge-types associated with retrieved first graph, based on obtained schema 612

Determine second count of each of identified set of edge-types 614

Determine two-dimensional (2D) distribution of each of identified set of edge-types, based on identified set of edge-types and identified set of node-types 616

Determine second statistical information associated with retrieved first graph, based on determined second count and determined 2D distribution 618

Identify set of combinations of edge-types connecting three node-types from retrieved first graph, based on obtained schema 620

Determine third count of each of set of three node-type groups from retrieved first graph, based on identified set of combinations 622

Determine three-dimensional (3D) distribution of each of set of three node-type groups, based on determined third count and identified set of combinations 624

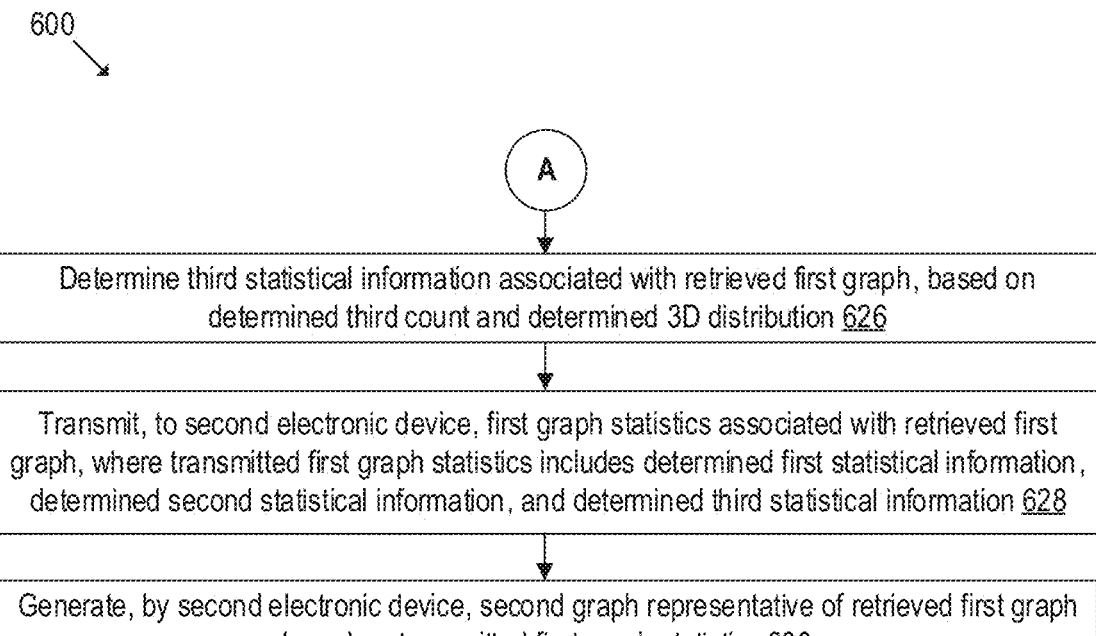

600

A

Determine third statistical information associated with retrieved first graph, based on determined third count and determined 3D distribution 626

Transmit, to second electronic device, first graph statistics associated with retrieved first graph, where transmitted first graph statistics includes determined first statistical information, determined second statistical information, and determined third statistical information 628

Generate, by second electronic device, second graph representative of retrieved first graph based on transmitted first graph statistics 630

FIG. 6B

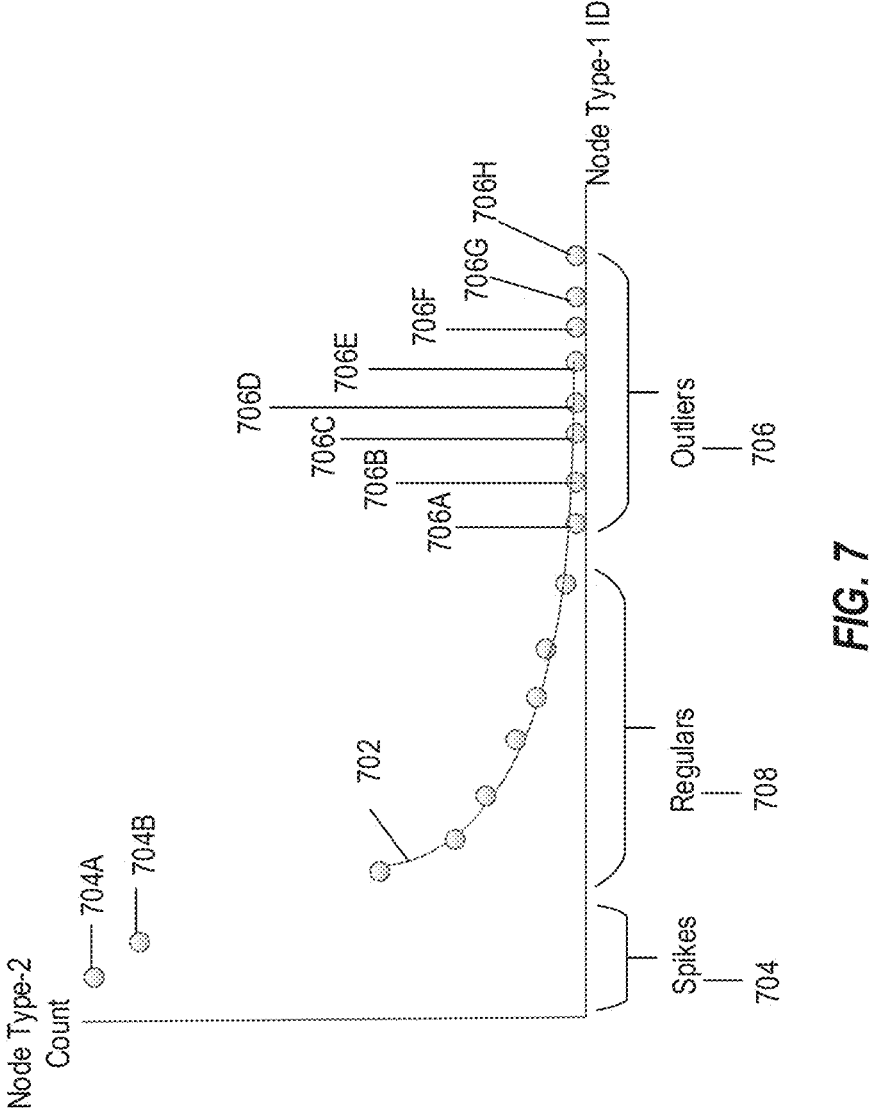
FIG. 7

900

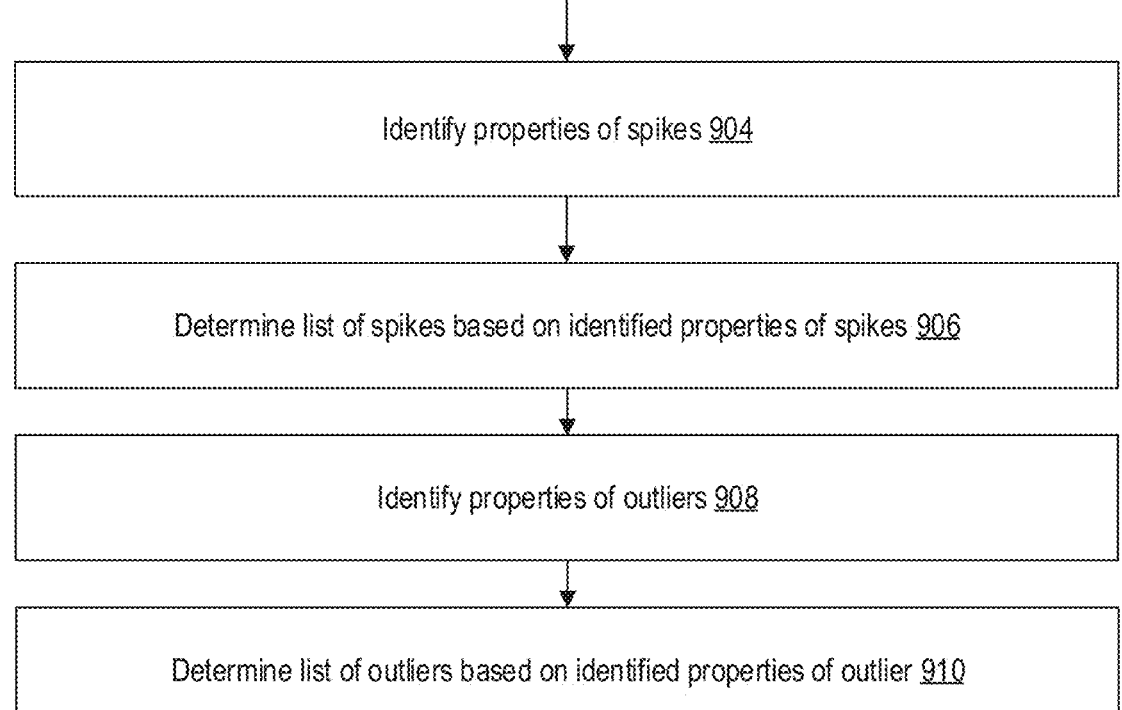

Divide determined 2D distributions into spikes, outliers, and regulars, where spikes correspond to set of first nodes of retrieved first graph, such that number of set of first nodes is below first threshold and determined second count corresponding to set of first nodes is above second threshold, where outliers correspond to set of second nodes of retrieved first graph, such that number of set of second nodes is above third threshold and determined second count corresponding to set of second nodes is below fourth threshold, and where regulars correspond to set of third nodes of retrieved first graph, such that set of third nodes includes nodes other than set of first nodes and set of second nodes of retrieved first graph
902

Identify properties of spikes 904

Determine list of spikes based on identified properties of spikes 906

Identify properties of outliers 908

Determine list of outliers based on identified properties of outlier 910

Identify distribution of regulars 1002

Sort identified distribution of regulars into plurality of buckets, where each of plurality of buckets includes bin corresponding to set of values associated with set of third nodes of retrieved first graph 1004

Determine histogram of regulars based on plurality of buckets 1006

1100

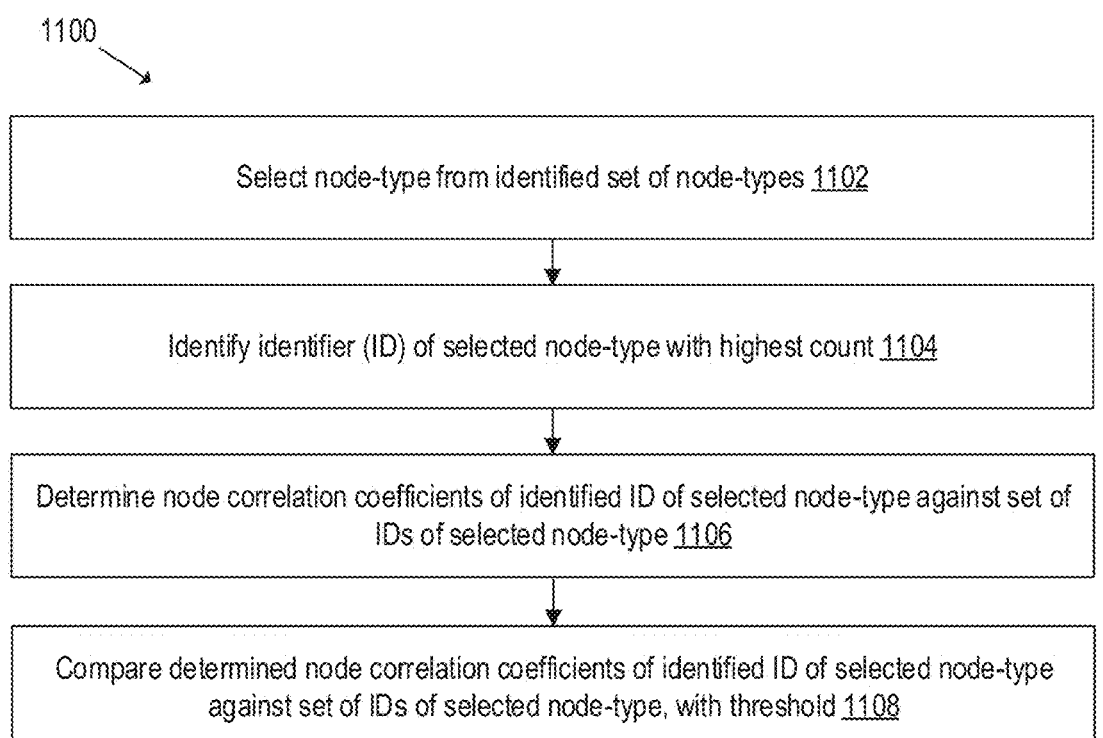

Select node-type from identified set of node-types 1102

Identify identifier (ID) of selected node-type with highest count 1104

Determine node correlation coefficients of identified ID of selected node-type against set of IDs of selected node-type 1106

Compare determined node correlation coefficients of identified ID of selected node-type against set of IDs of selected node-type, with threshold 1108

*FIG. 11*

1200

Add one or more first IDs of set of IDs of selected node-type to distribution class of set of distribution classes based on node correlation coefficient of identified ID against each of one or more first IDs being greater than threshold, where
each of set of distribution classes corresponds to set of 2D distributions from 2D distribution of each of identified set of edge-types 1202

Determine offset and range of each node in set of 2D distributions of each distribution class of set of distribution classes 1204

Normalize and average set of 2D distributions of each distribution class 1206

Determine list of distribution classes from set of distribution classes, based on normalizing and averaging, where
each distribution class of determined list of distribution classes corresponds to representative distribute, list of IDs, offset, and range 1208

*FIG. 12*

1300

Divide representative distribute of each distribution class of determined list of distribution classes into spikes, outliers, and regulars, where spikes correspond to set of first nodes of representative distribute, such that number of set of first nodes is below first threshold and determined second count corresponding to set of first nodes is above second threshold, where outliers correspond to set of second nodes of representative distribute, such that number of set of second nodes is above third threshold and determined second count corresponding to set of second nodes is below fourth threshold, and where regulars correspond to set of third nodes of representative distribute, such that set of third nodes includes nodes other than set of first nodes and set of second nodes of representative distribute 1302

Identify properties of spikes associated with representative distribute of corresponding distribution class of determined list of distribution classes 1304

Determine list of spikes based on identified properties of spikes associated with representative distribute of corresponding distribution class of determined list of distribution classes 1306

Identify properties of outliers associated with representative distribute of corresponding distribution class of determined list of distribution classes 1308

Determine list of outliers based on identified properties of outliers associated with representative distribute of corresponding distribution class of determined list of distribution classes 1310

Identify distribution of regulars associated with representative distribute of corresponding distribution class of determined list of distribution classes 1312

Sort identified distribution of regulars associated with representative distribute of corresponding distribution class of determined list of distribution classes into plurality of buckets, where each of plurality of buckets includes bin corresponding to set of values associated with set of third nodes of representative distribute 1314

Determine histogram of regulars based on plurality of buckets 1316

*FIG. 13*

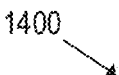

Determine one or more second IDs of set of IDs of selected node-type based on determined node correlation coefficient of identified ID against each of one or more second IDs, being lesser than threshold 1402

↓

Determine count of one or more second IDs of set of IDs of selected node-type 1404

↓

Add one or more second IDs of set of IDs of selected node-type to distribution class of set of distribution classes based on determination that count of one or more second IDs of set of IDs of selected node-type is less than threshold count, where
each of set of distribution classes corresponds to set of 2D distributions from 2D distribution of each of identified set of edge-types 1406

*FIG. 14*

Retrieve determined first statistical information associated with retrieved first graph from received first graph statistics associated with the first graph 1502

↓

Receive user-input parameters 1504

↓

Retrieve set of first node-types based on retrieved first statistical information, where list of nodes associated with second graph is generated based on retrieved set of first node-types and received user-input parameters 1506

*FIG. 15*

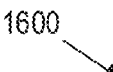
1600

| Retrieve determined second statistical information associated with retrieved first graph from received first graph statistics associated with first graph 1602 |
|---|
| Reconstruct set of 2D distributions associated with edge-types based on retrieved second statistical information, where list of scaled edge-distributions associated with second graph is generated based on reconstructed set of 2D distributions, generated list of nodes, and received user-input parameters 1604 |

FIG. 16

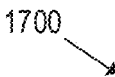
1700

| Retrieve determined third statistical information associated with retrieved first graph from received first graph statistics associated with first graph 1702 |
|---|
| Reconstruct 3D distribution of each of set of three node-type groups based on retrieved third statistical information, where list of scaled 3D distributions associated with second graph is generated based on reconstructed 3D distribution and generated list of nodes 1704 |
| Determine set of reconstructed combinations of edge-types connecting each of set of three node-type groups from list of scaled 3D distribution 1706 |

FIG. 17

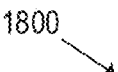

1800

Select first three node-type group from determined set of reconstructed combinations, where selected first three node-type group comprises first node-type, second node-type, and third node-type 1802

Control iterative execution of first set of operations on selected first three node-type group to generate second graph 1804

First set of operations 1806

Determine first distribution of first node-type and second node-type 1806A

Determine second distribution of first node-type and third node-type 1806B

Determine third distribution of second node-type and third node-type 1806C

Generate edges between nodes associated with selected first three node-types based on determined first distribution, determined second distribution, and received user-input parameters under constraint associated with determined third distribution 1806D Re-select second three node-type group from determined set of reconstructed combinations, as selected first three node-type group 1806E Generate second graph based on control of iterative execution of first set of operations 1808

FIG. 18

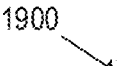

1900

Compare generated second graph with list of scaled edge-distributions associated with second graph 1902

Validate generated second graph based on comparison of generated second graph with list of scaled edge-distributions associated with second graph 1904

FIG. 19

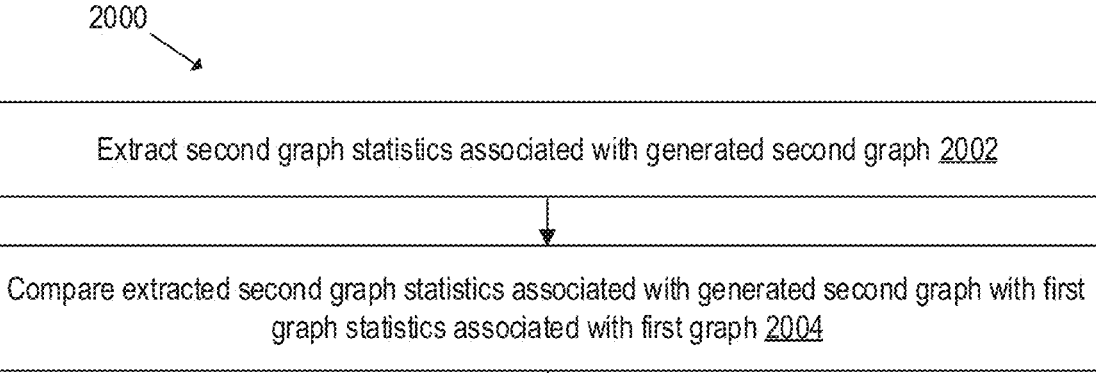

2000

Extract second graph statistics associated with generated second graph 2002

Compare extracted second graph statistics associated with generated second graph with first graph statistics associated with first graph 2004

Validate generated second graph based on comparison between extracted second graph statistics with first graph statistics 2006

FIG. 20

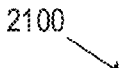

2100

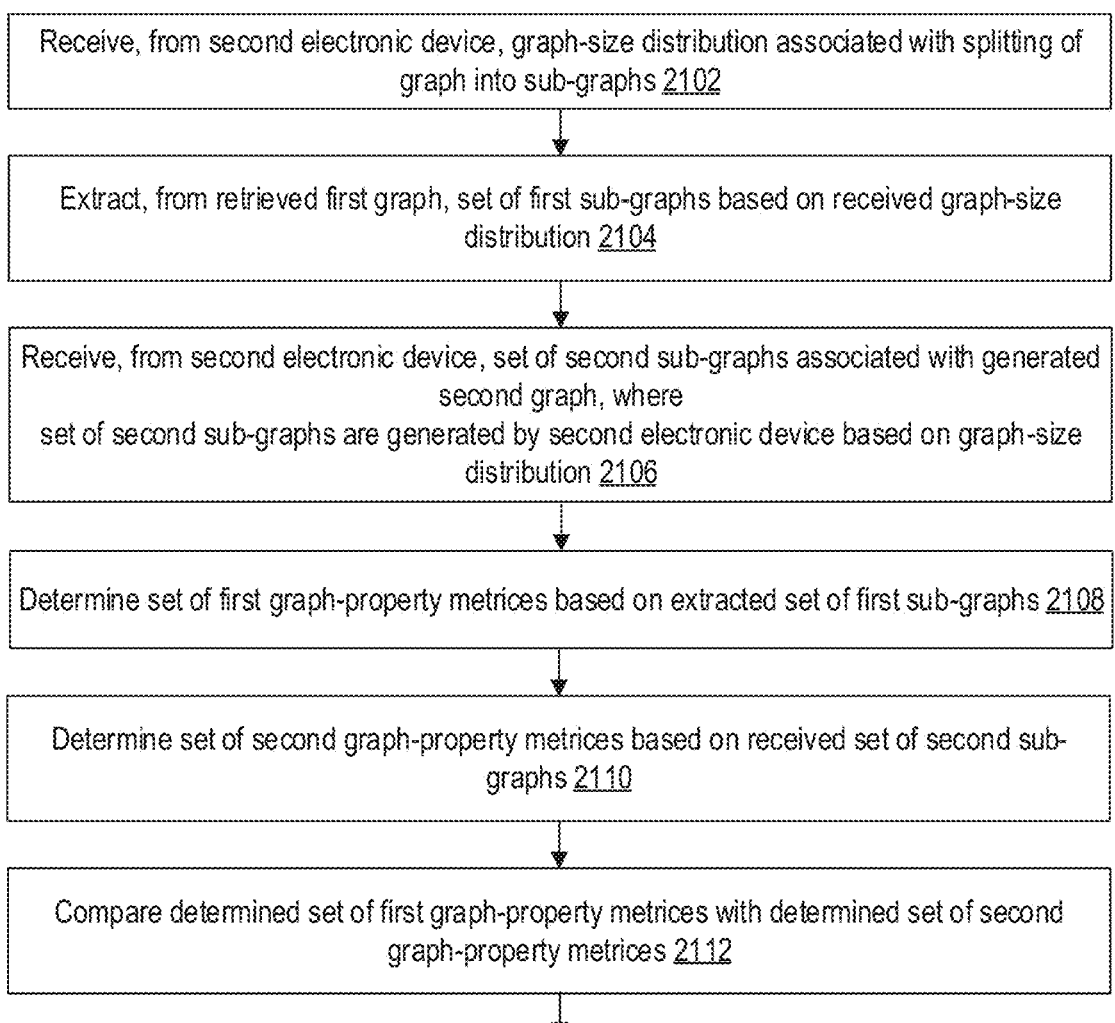

Receive, from second electronic device, graph-size distribution associated with splitting of graph into sub-graphs 2102

Extract, from retrieved first graph, set of first sub-graphs based on received graph-size distribution 2104

Receive, from second electronic device, set of second sub-graphs associated with generated second graph, where
set of second sub-graphs are generated by second electronic device based on graph-size distribution 2106

Determine set of first graph-property metrices based on extracted set of first sub-graphs 2108

Determine set of second graph-property metrices based on received set of second sub-graphs 2110

Compare determined set of first graph-property metrices with determined set of second graph-property metrices 2112

Validate generated second graph, based on comparison between determined set of first graph-property metrics and determined set of second graph-property metrics 2114

FIG. 21

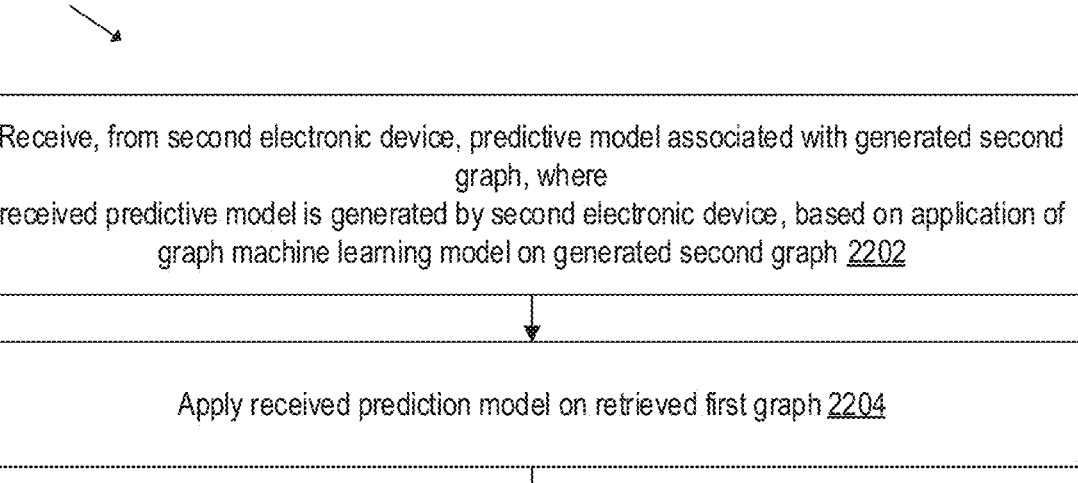

2200

Receive, from second electronic device, predictive model associated with generated second graph, where
received predictive model is generated by second electronic device, based on application of graph machine learning model on generated second graph 2202

Apply received prediction model on retrieved first graph 2204

Generate prediction output associated with retrieved first graph, based on application of received prediction model on retrieved first graph 2206

FIG. 22

REMOTE STATISTICAL GENERATION OF GRAPHS FOR GRAPH MACHINE LEARNING

FIELD

The embodiments discussed in the present disclosure are related to remote statistical generation of graphs for graph machine learning.

BACKGROUND

Advancements in the field of artificial intelligence (AI) and graphic machine learning (ML) have led to application of AI/ML algorithms in a variety of domains. Typically, information related to graphs may not be shared outside a service provider for training of the graph machine learning model in order to avoid privacy issues. A specific example may be collection of financial transactions held by a credit card issuer, where the transactions may connect numerous clients and merchants in intricate ways with a variety of patterns. Such information may be represented as the graph, where nodes in the graph may represent the entities of client, transactions or merchants, and edges in the graph may represents relationships between the entities. Typically, data masking may be used to create an alternate version of data that may not be easily identifiable, or reverse engineered. However, such techniques may not reduce an amount of information transfer and may also not help in data augmentation. Moreover, a laxity of enforcement of data security policies for external IT partners for generation of machine learning models may vary. Thus, the machine learning models that may be generated by the external IT partners, based on such shared data may lack accuracy or robustness.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, operations may include retrieving a first graph from a graph database. The operations may further include obtaining a schema associated with the retrieved first graph. The operations may further include identifying a set of node-types associated with the retrieved first graph based on the obtained schema. The operations may further include determining a first count of each of the identified set of node-types. The operations may further include determining first statistical information associated with the retrieved first graph, based on the determined first count. The operations may further include identifying a set of edge-types associated with the retrieved first graph, based on the obtained schema. The operations may further include determining a second count of each of the identified set of edge-types. The operations may further include determining a two-dimensional (2D) distribution of each of the identified set of edge-types, based on the identified set of edge-types and the identified set of node-types. The operations may further include determining second statistical information associated with the retrieved first graph, based on the determined second count and the determined 2D distribution. The operations may further include identifying a set of combinations of edge-types connecting three node-types from the retrieved first graph, based on the obtained schema. The operations may further include determining a third count of each of a set of three node-type groups from the retrieved first graph, based on the identified set of combinations. The operations may further include determining a three-dimensional (3D) distribution of each of the set of three node-type groups, based on the determined third count and the identified set of combinations. The operations may further include determining third statistical information associated with the retrieved first graph, based on the determined third count and the determined 3D distribution. The operations may further include transmitting, to a second electronic device, first graph statistics associated with the retrieved first graph. The transmitted first graph statistics may include the determined first statistical information, the determined second statistical information, and the determined third statistical information. Herein, a second graph representative of the retrieved first graph may be generated by the second electronic device based on the transmitted first graph statistics.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which:

FIG. 2 is a block diagram of a system for remote capture of graph statistics for graph recreation;

FIG. 3 is a block diagram of a system for local recreation of graphs from graph statistics;

FIGS. 6A and 6B are diagrams that collectively illustrate a flowchart of an example method for remote statistical generation of graphs for graph machine learning;

FIG. 7 is a diagram that illustrates an exemplary scenario of an exemplary two-dimensional (2D) distribution of a set of edge-types of a first graph;

FIG. 9 is a diagram that illustrates a flowchart of an example method for determination of spikes, outliers, and regulars associated with two-dimensional (2D) distributions of set of edge-types identified from a retrieved first graph;

FIG. 11 is a diagram that illustrates a flowchart of an example method for determination of third statistical information of a retrieved first graph;

FIG. 12 is a diagram that illustrates a flowchart of an example method for determination of third statistical information of a retrieved first graph;

3

Figure 1:
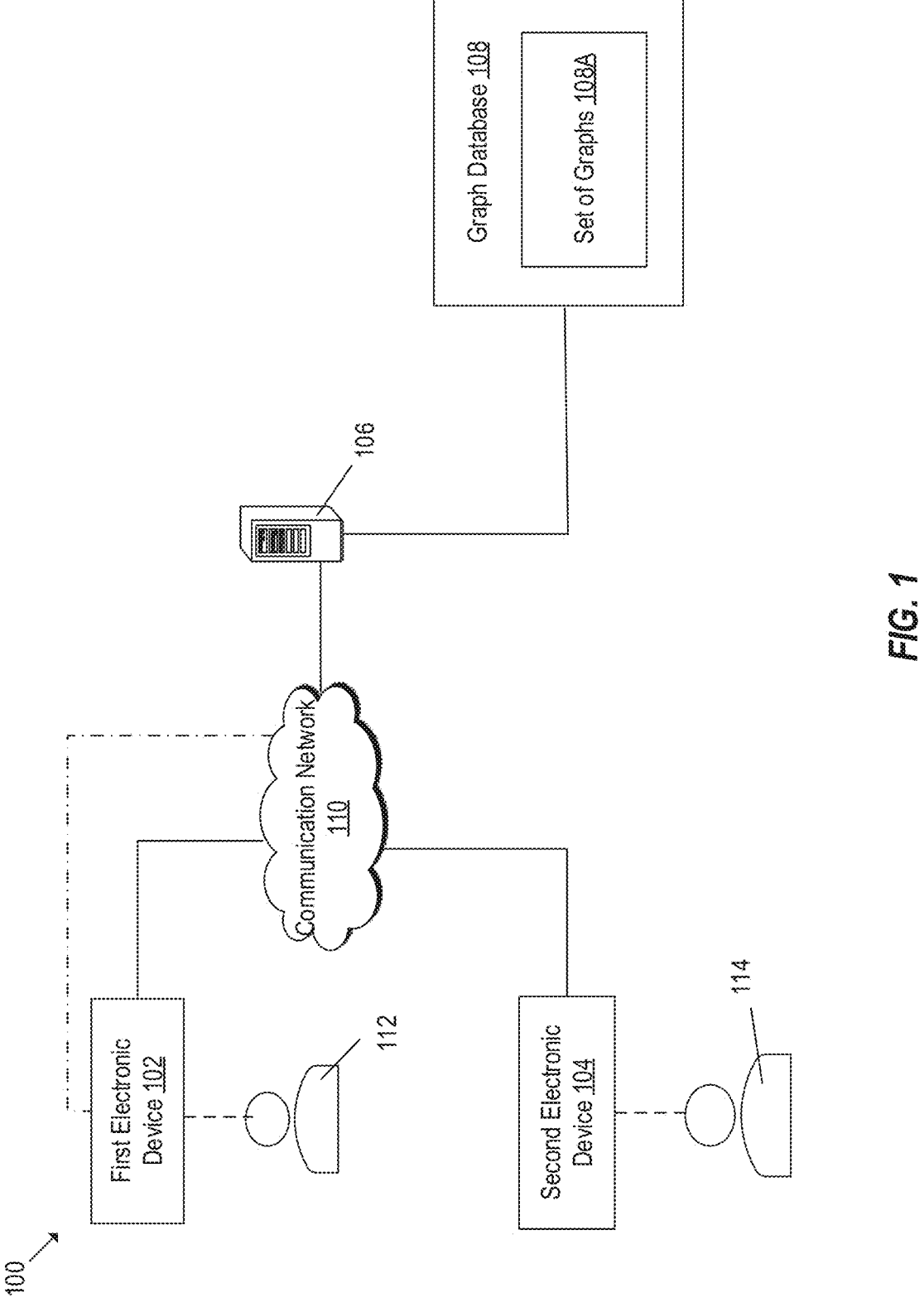
FIG. 1 is a diagram representing an example environment related to remote statistical generation of graphs for graph machine learning.

FIG. 13 is a diagram that illustrates a flowchart of an example method for determination of third statistical information of a retrieved first graph;

FIG. 14 is a diagram that illustrates a flowchart of an example method for determination of third statistical information of a retrieved first graph;

FIG. 15 is a diagram that illustrates a flowchart of an example method for generation of a list of nodes of a second graph to be generated from first graph statistics associated with a retrieved first graph;

FIG. 16 is a diagram that illustrates a flowchart of an example method for generation of a list of scaled edge-distributions of a second graph to be generated from first graph statistics associated with a retrieved first graph;

FIG. 17 is a diagram that illustrates a flowchart of an example method for determination of a set of reconstructed combinations of edge-types of a second graph to be generated from first graph statistics associated with a retrieved first graph;

FIG. 18 is a diagram that illustrates a flowchart of an example method for generation of the second set of graphs;

FIG. 19 is a diagram that illustrates a flowchart of an example method for validation of a generated second graph;

FIG. 20 is a diagram that illustrates a flowchart of an example method for validation of a generated second graph;

FIG. 21 is a diagram that illustrates a flowchart of an example method for validation of a generated second graph based on comparison between sets of first graph-property metrics; and FIG. 22 is a diagram that illustrates a flowchart of an example method for generation of a prediction output based on a predictive model determined based on an application of graph machine learning on a generated second graph;

all according to at least one embodiment described in the present disclosure.

DESCRIPTION OF EMBODIMENTS

Some embodiments described in the present disclosure relate to methods and systems for remote statistical generation of graphs for graph machine learning. In the present disclosure, a first graph from a graph database may be retrieved. Further, a schema associated with the retrieved first graph may be obtained. Further, a set of node-types associated with the retrieved first graph may be identified, based on the obtained schema. Thereafter, a first count of each of the identified set of node-types may be determined. Further, first statistical information associated with the retrieved first graph may be determined, based on the determined first count. Further, a set of edge-types associated with the retrieved first graph may be identified, based on the obtained schema. Further, a second count of each of the identified set of edge-types may be determined. Further, a two-dimensional (2D) distribution of each of the identified set of edge-types may be determined, based on the identified set of edge-types and the identified set of node-types. Thereafter, second statistical information associated with the retrieved first graph may be determined, based on the determined second count and the determined 2D distribution. Further, a set of combinations of edge-types connecting three node-types from the retrieved first graph may be identified, based on the obtained schema. Further, a third count of each of a set of three node-type groups from the retrieved first graph may be determined, based on the identified set of combinations. Further, a three-dimensional (3D) distribution of each of the set of three node-type groups may be determined, based on the determined third count and the identified set of combinations. Further, third statistical information associated with the retrieved first graph may be determined, based on the determined third count and the determined 3D distribution. Thereafter, first graph statistics associated with the retrieved first graph may be transmitted to a second electronic device. The transmitted first graph statistics may include the determined first statistical information, the determined second statistical information, and the determined third statistical information. Herein, a second graph representative of the retrieved first graph may be generated by the second electronic device, based on the transmitted first graph statistics.

According to one or more embodiments of the present disclosure, the technological field of graph processing and graph machine learning may be improved by configuring a computing system (e.g., a first electronic device) in a manner that the computing system may be able to retrieve a first graph from a graph database. The computing system may obtain a schema associated with the retrieved first graph. The computing system may further identify a set of node-types associated with the retrieved first graph based on the obtained schema. Then, the computing system may determine a first count of each of the identified set of node-types. Further, the computing system may determine first statistical information associated with the retrieved first graph, based on the determined first count. Thereafter, the computing system may identify a set of edge-types associated with the retrieved first graph, based on the obtained schema. Thereafter, the computing system may determine second count of each of the identified set of edge-types. Then, the computing system may determine a two-dimensional (2D) distribution of each of the identified set of edge-types, based on the identified set of edge-types and the identified set of node-types. The computing system may determine second statistical information associated with the retrieved first graph, based on the determined second count and the determined 2D distribution. The computing system may identify a set of combinations of edge-types connecting three node-types from the retrieved first graph, based on the obtained schema. Thereafter, the computing system may determine a third count of each of a set of three node-type groups from the retrieved first graph, based on the identified set of combinations. Then, the computing system may determine a three-dimensional (3D) distribution of each of the set of three node-type groups, based on the determined third count and the identified set of combinations. Then, the computing system may further determine third statistical information associated with the retrieved first graph, based on the determined third count and the determined 3D distribution. Further, the computing system may transmit, to a second electronic device, first graph statistics associated with the retrieved first graph, the transmitted first graph statistics may include the determined first statistical information, the determined second statistical information, and the determined third statistical information. Herein, a second graph representative of the retrieved first graph may be generated by the second electronic device based on the transmitted first graph statistics.

Traditional methods for secure data mobility such as, data masking may be used to create an alternate version of data from which personal identifiable information may not be deduced. However, such techniques may neither reduce an amount of information that may be required to be transferred nor help in data augmentation. Moreover, a laxity of enforcement of data security policies for external IT partners for generation of machine learning model may vary. Thus, the machine learning models that may be generated by the external IT partners, based on such shared data may lack accuracy or robustness. On the other hand, the disclosed first electronic device may provide data privacy for a customer at a remote site by only capturing anonymized metadata. The first electronic device may efficiently capture data at the remote site with a statistical method. The disclosed second electronic device may generate truthful reproduction of customer knowledge graphs called as the second graph at a local site, which may be suitable for machine learning (such as, using graph neural networks (GNNs)). A predictive model may be generated based on the training of the GNN at the local site and transmitted to the remote site for predictions. Moreover, graph data such as, the first graph statistics may be native to handle variations in graph topology and graph properties. Furthermore, parameterized metadata may allow creation of custom and what-if scenarios in the generated second graph. Same metadata, such as, the second graph statistics may be extracted from generated second graph and compared against original metadata, such as the first graph statistics, for validation of truthful graph recreation. Thus, the privacy of data may be maintained by anonymization of the graph data before transmission at the remote site, and accurate reproduction based on graph statistics at the local site. As, the generated graph may be validated at the local site prior to the training of the GNN, the predictive model build based on the generated graph at the local site may be highly accurate.

The present disclosure may be applied in various scenarios, such as, but not limited to, banking, financial transactions, and credit card issuer, where transactions and relationships between entities that may be private, and entities may not be willing to share such data. Moreover, the present disclosure may be applied to medical records in healthcare, where compliance and governance may place a strictly limit on what data may be disclosed and so working on simulated data may be an alternative. Further, the present disclosure may be applied to data reduction for e-commerce or social network, where volume of relational data may be too large to handle. Thus, statistical extraction such as, the first statistical information, the second statistical information, and the third statistical information, may allow data to be recreated in various sizes and mixes for machine learning. The present disclosure may be further applied to education and children privacy, wherein working on simulated data may eliminate worries about a child's personally identifiable information. Herein, the first electronic device may build and analyze relational data for remote and online learning more effectively. Embodiments of the present disclosure are explained with reference to the accompanying drawings.

FIG. 1 is a diagram representing an example environment related to remote statistical generation of graphs for graph machine learning, according to at least one embodiment described in the present disclosure. With reference to FIG. 1, there is shown an environment 100. The environment 100 may include a first electronic device 102, a second electronic device 104, a server 106, a graph database 108, and a communication network 110. The first electronic device 102, the second electronic device 104, the server 106 may be communicatively coupled to one another, via the communication network 110. The graph database 108 may include a set of graphs 108A. In FIG. 1, there is further shown a first user 112, who may be associated with or operate the first electronic device 102 and a second user 114, who may be associated with or operate the second electronic device 104.

The first electronic device 102 may include suitable logic, circuitry, and interfaces that may be configured to retrieve a first graph from the graph database 108. The first electronic device 102 may be further configured to obtain a schema associated with the retrieved first graph. The first electronic device 102 may determine first graph statistics associated with the retrieved first graph, wherein the first graph statistics may include first statistical information, second statistical information, and third statistical information, associated with the retrieved first graph. The first electronic device 102 may transmit the first graph statistics associated with the retrieved first graph to the second electronic device 104 for a generation of a second graph representative of the first graph and a generation of a predictive model. The predictive model may be generated based on an application of graph machine learning on the generated second graph. The first electronic device 102 may receive the generated second graph and the generated predictive model. The first electronic device 102 may validate the received second graph with respect to the retrieved first graph. Based on successful validation, the first electronic device 102 may use the received predictive model for predictions. Examples of the first electronic device 102 may include, but are not limited to, a computing device, a smartphone, a cellular phone, a mobile phone, a gaming device, a mainframe machine, a server, a graph-processing machine, a computer workstation, and/or a consumer electronic (CE) device.

The second electronic device 104 may include suitable logic, circuitry, and interfaces that may be configured to receive the first graph statistics associated with the retrieved first graph from the first electronic device 102. The second electronic device 104 may be further configured to generate the second graph representative of the retrieved first graph based on the received first graph statistics. The second electronic device 104 may generate second graph statistics associated with the generated second graph and compare the generated second graph statistics with the received first graph statistics. The second electronic device 104 may validate the generated second graph, based on the comparison. The second electronic device 104 may further generate the predictive model based on an application of graph machine learning on the generated second graph. The second electronic device 104 may transmit the generated (and validated) second graph and the generated predictive model to the first electronic device 102. Examples of the second electronic device 104 may include, but are not limited to, a computing device, a smartphone, a cellular phone, a mobile phone, a gaming device, a mainframe machine, a server, a graph-processing machine, a computer workstation, and/or a consumer electronic (CE) device.

The server 106 may include suitable logic, circuitry, and interfaces, and/or code that may be configured to process the retrieved first graph to determine the first graph statistics associated with the retrieved first graph. The server 106 may be further configured to generate the second graph. In an embodiment, the server 106 may also generate the predictive model based on the generated second graph. The server 106 may be implemented as a cloud server and may execute operations through web applications, cloud applications, HTTP requests, repository operations, file transfer, and the like. Other example implementations of the server 106 may include, but are not limited to, a database server, a file server, a web server, a media server, an application server, a mainframe server, or a cloud computing server.

In at least one embodiment, the server 106 may be implemented as a plurality of distributed cloud-based resources by use of several technologies that are well known to those ordinarily skilled in the art. A person with ordinary skill in the art will understand that the scope of the disclosure may not be limited to the implementation of the server 106, the first electronic device 102, and the second electronic device 104 as separate entities. In certain embodiments, the functionalities of the first electronic device 102 may be incorporated in its entirety or at least partially in the server 106, without a departure from the scope of the disclosure. In certain embodiments, the server 106 may host the graph database 108. Alternatively, the server 106 may be separate from the graph database 108 and may be communicatively coupled to the graph database 108.

The graph database 108 may include suitable logic, interfaces, and/or code that may be configured to store the set of graphs 108A. The graph database 108 may be derived from data off a relational or non-relational database, or a set of comma-separated values (csv) files in conventional or big-data storage. The graph database 108 may be stored or cached on a device, such as a server (e.g., the server 106) or the first electronic device 102. The device storing the graph database 108 may be configured to receive a query for the first graph from the first electronic device 102. In response, the device of the graph database 108 may be configured to retrieve and provide the queried first graph to the first electronic device 102 based on the received query.

In some embodiments, the graph database 108 may be hosted on a plurality of servers stored at same or different locations. The operations of the graph database 108 may be executed using hardware including a processor, a microprocessor (e.g., to perform or control performance of one or more operations), a field-programmable gate array (FPGA), or an application-specific integrated circuit (ASIC). In some other instances, the graph database 108 may be implemented using software.

The communication network 110 may include a communication medium through which the first electronic device 102 and the server 106 may communicate with one another. Further, the communication network 110 may also connect the first electronic device 102 and the second electronic device 104. In an embodiment, the first electronic device 102 and the server 106 may be connected through a first communication network, and the first electronic device 102 and the second electronic device 104 may be connected through a second communication network different from the first communication network. For example, the first electronic device 102 and the server 106 may be connected through an internal network (such as, a Local Area Network (LAN), or a Wireless LAN (WLAN)) or a Virtual Private Network (VPN), while the first electronic device 102 and the second electronic device 104 may be connected through an external network (such as, a Wide Area Network (WAN), or the Internet). In another embodiment, the first electronic device 102, the second electronic device 104, and the server 106 may be connected through a common communication network. The communication network 110 may be one of a wired connection or a wireless connection. Examples of the communication network 110 may include, but are not limited to, the Internet, a cloud network, Cellular or Wireless Mobile Network (such as Long-Term Evolution and 5G New Radio), a Wireless Fidelity (Wi-Fi) network, a Personal Area Network (PAN), a Local Area Network (LAN), or a Metropolitan Area Network (MAN). Various devices in the environment 100 may be configured to connect to the communication network 110 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the first electronic device 102 may be configured to retrieve a first graph from the graph database 108. The retrieved first graph may include a plurality of nodes and a plurality of edges. Herein, each of the plurality of edges may connect one or more nodes of the plurality of nodes. Each of one or more edges of the plurality of edges may be associated with an attribute. In an embodiment, the retrieved first graph may correspond to at least one of: a banking entity, financial transactions, a credit card issuer entity, medical records associated with a healthcare entity, an e-commerce domain, a social networking domain, an education domain, or personally identifiable information associated with children. An example of the retrieved first graph is further provided, for example, in FIG. 5.

The first electronic device 102 may be configured to obtain a schema associated with the retrieved first graph. It may be appreciated that the schema of the graph may provide relationships between different nodes, edges, and properties of the retrieved first graph. For example, the schema of the first graph may provide allowable relationships between different node-types, edge-types, and properties in a node-type or edge-type associated with the retrieved first graph. In an example, according to the schema of the retrieved first graph, a "Cardholder" node-type may not connect directly to a "Point-of-Sales" node-type of the first graph related to financial transactions. Details related to the schema associated with the retrieved first graph are further provided, for example, in FIG. 6A and FIG. 6B.

The first electronic device 102 may be configured to identify the set of node-types associated with the retrieved first graph based on the obtained schema. It may be noted that the retrieved first graph may include multitude of nodes which may be of different node-types. For example, if the retrieved first graph is associated with a credit card issuer, then the identified set of node-types may be client nodes, transaction nodes, item nodes, and merchant nodes. Details of the identification of set of node-types associated with the retrieved first graph are further provided, for example, in FIG. 5.

The first electronic device 102 may be configured to determine a first count of each of the identified set of node-types. Herein, a number of nodes associated with a given node-type in the retrieved first graph may be counted to determine the first count for the corresponding given node-type. In an example, the number of client nodes in the retrieved first graph may be 100. Hence, the first count of the client nodes of be 100. Details of the determination of the first count are further provided, for example, in FIG. 6A and FIG. 6B.

The first electronic device 102 may be configured to determine first statistical information associated with the retrieved first graph based on the determined first count. It may be noted that the first graph such as the first graph may be subdivided into a plurality of levels. Each level may be associated with corresponding statistical information. Each statistical information may be required to capture characteristics of the full retrieved first graph. The first statistical information associated with the retrieved first graph may be associated with a level-1 (i.e., a first level) of the first graph. Herein, the first level may include the set of node-types associated with the retrieved first graph and the first statistical information may be obtained based on the first count of each of the node-type. Details of the determination of the first count are further provided, for example, in FIG. 6A and FIG. 6B.

The first electronic device 102 may be configured to identify a set of edge-types associated with the retrieved first graph, based on the obtained schema. The first graph may include different edge-types based on the node-types the corresponding edge-type may connect. For example, the set of edge-types may be client-merchant edge type, client-transaction edge type, and the like. In an example, the identified set of node-types of the retrieved first graph may correspond to at least one of: a customer node-type, a merchant node-type, a transaction node-type, or an item node-type, and the identified set of edge-types of the retrieved first graph may include an amount edge-type. Details of the identification of the set of edge-types are further provided, for example, in FIG. 6A and FIG. 6B.

The first electronic device 102 may be configured to determine a second count of each of the identified set of edge-types. The second count may be determined based on a determination of a number of edges in the edge-type for every edge-type that may connect two node-types. The second count of the edge-type may be a number of edges of the corresponding edge-type. Details of the determination of the second count are further provided, for example, in FIG. 6A and FIG. 6B.

The first electronic device 102 may be configured to determine a two-dimensional (2D) distribution of each of the identified set of edge-types, based on the identified set of edge-types and the identified set of node-types. The 2D distribution may be determined by taking the second count of one node-type on one axis and each node of another node-type on another axis. For example, the 2D distribution may denote a number of transactions for each client. Herein, each node of client-node type may be taken along one axis and number of transactions made by each node of client-node type may be plotted on another axis. Details of the determination of the 2D distribution are further provided, for example, in FIG. 6A and FIG. 6B.

The first electronic device 102 may be configured to determine second statistical information associated with the retrieved first graph, based on the determined second count and the determined 2D distribution. The second statistical information may provide statistical information pertaining to a level-2 (i.e., a second level) of the retrieved first graph. It may be noted the level-2 may include all pairs of nodes of different node types that may be connected with an edge such as, client-transaction edge, transaction-item edge and the like. Details of the determination of the second statistical information are further provided, for example, in FIG. 9.

The first electronic device 102 may be configured to identify a set of combinations of edge-types connecting three node-types from the retrieved first graph, based on the obtained schema. The set of combinations of edge-types connecting three node-types may be identified directly from the schema of the retrieved first graph. The set of combinations of edge-types connecting three node-types may deduce possibilities for a two-hop connection between node-types. Details of the identification of the set of combinations of edge-types are further provided, for example, in FIG. 6A and FIG. 6B.

The first electronic device 102 may be configured to determine a third count of each of a set of three node-type groups from the retrieved first graph, based on the identified set of combinations. Each of the three node-type groups may be treated as a sub-graph. For every three node-type group, the third count of number of the sub-graphs in the corresponding three node-type group may be determined. Details of the determination of the third count are further provided, for example, in FIG. 6A and FIG. 6B.

The first electronic device 102 may be configured to determine a three-dimensional (3D) distribution of each of the set of three node-type groups, based on the determined third count and the identified set of combinations. The 3D distribution may be determined by taking the count of one node-type versus other two node-types such as, number of transactions for each client-merchant combination. Details of the determination of the 3D distribution are further provided, for example, in FIG. 6A and FIG. 6B.

The first electronic device 102 may be configured to determine third statistical information associated with the retrieved first graph, based on the determined third count and the determined 3D distribution. It may be noted that the third statistical information may be statistical information related to a level-3 (i.e., a third level) of the retrieved first graph. Herein, the level-3 may include all groups of nodes of three different node types that are connected such as, client-transaction-merchant group, client-transaction-item group, and the like. Details of the determination of the third statistical information further provided for example, in FIG. 6A and FIG. 6B.

The first electronic device 102 may be configured to transmit, to the second electronic device, first graph statistics associated with the retrieved first graph. The transmitted first graph statistics may include the determined first statistical information, the determined second statistical information, and the determined third statistical information. The first graph statistics may be a combination of the determined first statistical information, the determined second statistical information, and the determined third statistical information. Details of the first graph statistics further provided, for example, in FIG. 6A and FIG. 6B.

The second electronic device 104 may be configured to generate a second graph representative of the retrieved first graph based on a reception of first graph statistics associated with the first graph. The second set of graphs 422 may be generated based on the first statistical information, the second statistical information, and the third statistical information. Details of generation of the second graph are further provided, for example, in FIG. 6A and FIG. 6B.

Modifications, additions, or omissions may be made to FIG. 1 without departing from the scope of the present disclosure. For example, the environment 100 may include more or fewer elements than those illustrated and described in the present disclosure. For instance, in some embodiments, the environment 100 may include the first electronic device 102 but not the graph database 108. In addition, in some embodiments, the functionality of each of the graph database 108 and the server 106 may be incorporated into the first electronic device 102, without a deviation from the scope of the disclosure.

FIG. 2 is a block diagram of a system for remote capture of graph statistics for of graph recreation, in accordance with at least one embodiment described in the present disclosure. FIG. 2 is explained in conjunction with elements from FIG. 1. With reference to FIG. 2, there is shown a block diagram 200 of a system 202 including the first electronic device 102. The first electronic device 102 may include a processor 204, a memory 206, an input/output (I/O) device 208 (including a display device 208A), and a network interface 210.

The processor 204 may include suitable logic, circuitry, and interfaces that may be configured to execute a set of instructions stored in the memory 206. The processor 204 may be configured to execute program instructions associated with different operations to be executed by the first electronic device 102. For example, some of the operations may include retrieving the first graph from the graph database 108, obtaining the schema associated with the retrieved first graph, and identifying the set of node-types associated with the retrieved first graph based on the obtained schema. The operations may further include the determination of the first statistical information, the second statistical information, and the third statistical information associated with the retrieved first graph. The operations may further include the transmission of the first graph statistics including the first statistical information, the second statistical information, and the third statistical information to the second electronic device 104. The processor 204 may be implemented based on a number of processor technologies known in the art. Examples of the processor technologies may include, but are not limited to, a Central Processing Unit (CPU), X86-based processor, a Reduced Instruction Set Computing (RISC) processor, an Application-Specific Integrated Circuit (ASIC) processor, a Complex Instruction Set Computing (CISC) processor, a Graphical Processing Unit (GPU), and other processors.

Although illustrated as a single processor in FIG. 2, the processor 204 may include any number of processors configured to, individually or collectively, perform or direct performance of any number of operations of the first electronic device 102 or the second electronic device 104, as described in the present disclosure. Additionally, one or more of the processors may be present on one or more different electronic devices, such as different servers. In some embodiments, the processor 204 may be configured to interpret and/or execute program instructions and/or process data stored in the memory 206. After the program instructions are loaded into the memory 206, the processor 204 may execute the program instructions. Some of the examples of the processor 204 may be a Graphics Processing Unit (GPU), a Central Processing Unit (CPU), a Reduced Instruction Set Computer (RISC) processor, an ASIC processor, a Complex Instruction Set Computer (CISC) processor, a co-processor, and/or a combination thereof.

The memory 206 may include suitable logic, circuitry, and interfaces that may be configured to store the one or more instructions to be executed by the processor 204. The one or more instructions stored in the memory 206 may be executed by the processor 204 to perform the different operations of the processor 204 (and the first electronic device 102). The memory 206 may be configured to store the set of graphs 108A including, for example, the first graph. The memory 206 may be further configured to store the determined first count, the determined second count, the determined third count, the determined 2D distribution, the determined 3D distribution, the determined first statistical information, the second statistical information, the third statistical information, and the first graph statistics. Examples of implementation of the memory may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 208 may include suitable logic, circuitry, and interfaces that may be configured to receive an input from the first user 112 and/or the second user 114 and provide an output based on the received input. For example, the I/O device 208 may receive from the first user 112, a user-input associated with the retrieval of the first graph and/or the generation of the predictive model. Further, the I/O device 208 may render the generated second graph. The I/O device 208 may include various input and output devices, may be configured to communicate with the processor 204. Examples of the I/O device 208 may include, but are not limited to, a touch screen, a keyboard, a mouse, a joystick, a microphone, a display device (such as, the display device 208A), and a speaker The display device 208A may include suitable logic, circuitry, and interfaces that may be configured to display the set of graphs 108A. The display device 208A may be a touch screen, which may enable a user (e.g., the first user 112) to provide a user-input via the display device 208A. The touch screen may be at least one of a resistive touch screen, a capacitive touch screen, or a thermal touch screen. The display device 208A may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 208A may refer to a display screen of a head mounted device (HMD), a smart-glass device, a see-through display, a projection-based display, an electro-chromic display, or a transparent display.

The network interface 210 may include suitable logic, circuitry, and interfaces that may be configured to facilitate communication between the processor 204, the server 106, the first electronic device 102 (or any other device in the environment 100), via the communication network 110. The network interface 210 may be implemented by use of various known technologies to support wired or wireless communication of the first electronic device 102 with the communication network 110. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 210 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), 5th Generation (5R) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

Modifications, additions, or omissions may be made to the example first electronic device 102 without departing from the scope of the present disclosure. For example, in some embodiments, the example first electronic device 102 may include any number of other components that may not be explicitly illustrated or described for the sake of brevity.

FIG. 3 is a block diagram of a system for local recreation of graphs from graph statistics, in accordance with at least one embodiment described in the present disclosure. FIG. 3 is explained in conjunction with elements from FIG. 1 and FIG. 2. With reference to FIG. 3, there is shown a block diagram 300 of a system 302 including the second electronic device 104. The second electronic device 104 may include a processor 304, a memory 306, an input/output (I/O) device 308 (including a display device 308A), and a network interface 310.

The processor 304 may include suitable logic, circuitry, and interfaces that may be configured to execute a set of instructions stored in the memory 306. The processor 304 may be configured to execute program instructions associated with different operations to be executed by the second electronic device 104. For example, some of the operations may include receiving the first graph statistics associated with the first graph from the first electronic device 102, generating the second graph representative of the first graph, and transmission of the generated second graph to the first electronic device 102. The operations may further include the generation of the predictive model based on an application of a graph machine learning on the generated second graph. The operations may further include transmission of the generated predictive model to the first electronic device 102. The processor 304 may be implemented based on a number of processor technologies known in the art. Examples of the processor technologies may include, but are not limited to, a Central Processing Unit (CPU), X86-based processor, a Reduced Instruction Set Computing (RISC) processor, an Application-Specific Integrated Circuit (ASIC) processor, a Complex Instruction Set Computing (CISC) processor, a Graphical Processing Unit (GPU), and other processors.

The memory 306 may include suitable logic, circuitry, and interfaces that may be configured to store the one or more instructions to be executed by the processor 304. The one or more instructions stored in the memory 306 may be executed by the processor 304 to perform the different operations of the processor 304 (and the second electronic device 104). The memory 306 may be configured to store the graph machine learning model 306A. The memory 306 may further store the generated second graph. The memory 306 may be further configured to store statistics (e.g., second statistics) associated with the generated second graph. The memory 306 may further store the predictive model generated based on the second graph. Examples of implementation of the memory may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The graph machine learning model 306A may be a graph neural network (GNN) model that may include suitable logic, circuitry, interfaces, and/or code that may configured to classify or analyze input graph data to generate an output result for a particular real-time application. For example, a trained GNN model may recognize different nodes in the input graph data, and edges between each node in the input graph data. The edges may correspond to different connections or relationship between each node in the input graph data. Based on the recognized nodes and edges, the trained GNN model may classify different nodes within the input graph data, into different labels or classes. In an example, a particular node of the input graph data may include a set of features associated therewith. Further, each edge may connect with different nodes having similar set of features. The second electronic device 104 may be configured to encode the set of features to generate a feature vector using the GNN model. After the encoding, information may be passed between the particular node and the neighboring nodes connected through the edges. Based on the information passed to the neighboring nodes, a final vector may be generated for each node. Such final vector may include information associated with the set of features for the particular node as well as the neighboring nodes, thereby providing reliable and accurate information associated with the particular node. As a result, the GNN model may analyze the information represented as the input graph data. The GNN model may be implemented using hardware including a processor, a microprocessor (e.g., to perform or control performance of one or more operations), a field-programmable gate array (FPGA), or an application-specific integrated circuit (ASIC). In some other instances, the GNN model may be a code, a program, or set of software instruction. The GNN model may be implemented using a combination of hardware and software.

In some embodiments, the GNN model may correspond to multiple classification layers for classification of different nodes in the input graph data, where each successive layer may use an output of a previous layer as input. Each classification layer may be associated with a plurality of edges, each of which may be further associated with plurality of weights. During training, the GNN model may be configured to filter or remove the edges or the nodes based on the input graph data and further provide an output result (i.e. a graph representation) of the GNN model. Examples of the GNN model may include, but are not limited to, a graph convolution network (GCN), a Graph Spatial-Temporal Networks with GCN, a recurrent neural network (RNN), a deep Bayesian neural network, and/or a combination of such networks. The graph machine learning model 306A may be trained based on the generated second graph (e.g., a second set of graphs 422 of FIG. 4) to generating a predictive model (e.g., a predictive model 428). The processor 304 may be configured to transmit the generated predictive model 428 to the first electronic device 102.

The functions of the input/output (I/O) device 308, the display device 308A, and the network interface 310 may be same as the functions of the input/output (I/O) device 208, the display device 208A, and a network interface 210, respectively, as described, for example, in FIG. 2. Therefore, the description of the input/output (I/O) device 308, the display device 308A, and the network interface 310 is omitted from the disclosure for the sake of brevity.

Modifications, additions, or omissions may be made to the example second electronic device 104 without departing from the scope of the present disclosure. For example, in some embodiments, the example second electronic device 104 may include any number of other components that may not be explicitly illustrated or described for the sake of brevity.

Figure 4A:
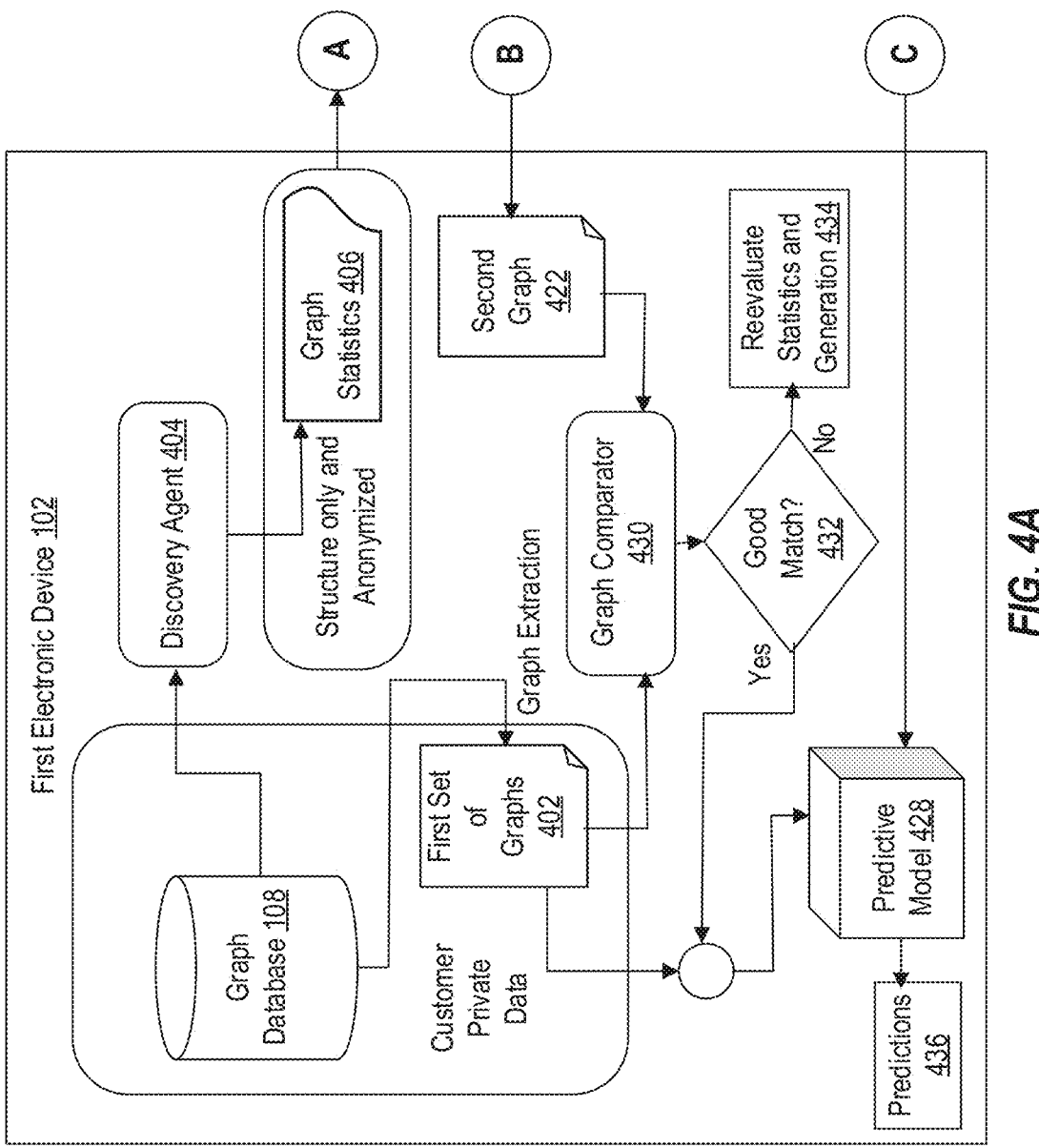
FIGS. 4A and 4B collectively depict a diagram that illustrates an execution pipeline for remote statistical generation of graphs for graph machine learning.
Figure 4B:

FIGS. 4A and 4B collectively depict a diagram that illustrates an execution pipeline for remote statistical generation of graphs for graph machine learning, in accordance with at least one embodiment described in the present disclosure. FIGS. 4A and 4B are explained in conjunction with elements from FIG. 1, FIG. 2, and FIG. 3. With reference to FIGS. 4A and 4B, there is shown an execution pipeline 400. The execution pipeline 400 may include the graph database 108, a first set of graphs 402, a discovery agent 404, first graph statistics 406, a graph generator 408, a graph network 410, a discovery agent 412, second graph statistics 414, a statistics verifier 416, a second set of graphs 422, a predictive model 428, a graph comparator 430, and predictions 436. The graph database 108, the first set of graphs 402, the discovery agent 404, and graph comparator 430 may be located at a remote site such as, the at the first electronic device 102. The graph generator 408, the graph network 410, the discovery agent 412, and the statistics verifier 416 may be present at a local site, such as, the second electronic device 104. The execution pipeline 400 may further include a set of operations that may be executed by one or more components of FIG. 1, such as, the first electronic device 102. The set of operations may include 418, 420, 424, 426, 432, and 434. The set of operations may be performed by the first electronic device 102 and/or the second electronic device 104 for remote statistical generation of graphs, as described herein.

The processor 204 may retrieve a first set of graphs 402. The retrieved first set of graphs may be provided to the discovery agent 404. The discovery agent 404 may structure and anonymize the first set of graphs 402. Further the discovery agent 404 may determine the first graph statistics 406. It may be noted that the first graph statistics 406 may be captured on a full graph database, and not a graph-by-graph basis. The first graph statistics 406 may be transmitted to the local site, such as, the second electronic device 104. The transmitted first graph statistics 406 may be provided to the graph generator 408 for generation of the second set of graphs 422. The generated second set of graphs 422 may be stored in the graph network 410. In other words, the first graph statistics 406 generated by the discovery agent 404 at the remote customer location such as, the first electronic device 102 may be sent to a local IT provider location such as, the second electronic device 104, as a local copy. The graph generator 408 may use the first graph statistics 406 to create a reproduction of original knowledge graphs such as, the first set of graphs 402 as a generated knowledge graph such as, the second set of graphs 422. The graph network 410 may include the second set of graphs 422 that may be provided to the discovery agent 412 for determination of the second graph statistics 414. It may be noted that the recreation of the graphs in the graph network 410 may be for the full graph data and not on a graph-by-graph basis. That is, the graph network 410 may determine the second set of graphs 422 for the first set of graphs 402. The first graph statistics 406 and the second graph statistics 414 may be provided to the statistics verifier 416.

At 418, the processor 304 may use the statistics verifier 416 to compare the first graph statistics 406 and the second graph statistics 414 and determine whether the first graph statistics 406 and the second graph statistics 414 closely match. If the first graph statistics 406 and the second graph statistics 414 closely match, then the second set of graphs 422 may be extracted from the graph network 410. Further, at 424, the processor 304 may execute label scoring on the second set of graphs 422, based on the successful match.

At 420, based on the comparison of the first graph statistics 406 and the second graph statistics 414, if it is determined that the first graph statistics 406 and the second graph statistics 414 do not closely match, the generation of the second graph statistics 414 may be re-evaluated. At 424, label scoring may be executed. The processor 304 may be configured to determine label scores associated with the second set of graphs 422. The label score along with the second set of graphs 422 may be provided to the graph machine learning 426 (e.g., the graph machine learning model 306A) to train the machine learning model (such as, a GNN) to obtain the predictive model 428. The second electronic device 104 may transmit the generated second set of graphs 422 and the predictive model 428 to the remoted site such as, the first electronic device 102.

At the first electronic device 102, the second set of graphs 422 may be received from the second electronic device 104.

The graph comparator 430 may compare the first set of graphs 402 and the second set of graphs 422. At 432, based on the comparison of the first set of graphs 402 and the second set of graphs 422, if it is determined that the first set of graphs 402 matches the second set of graphs 422, then the received predictive model 428 may be used for predictions. In case the predictive model 428 is to be used for predictions, customer private data and the second set of graphs 422 may be provided to the predictive model 428 and predictions 436 may be made based on an application of the predictive model 428 on the customer private data and the second set of graphs 422. If the first set of graphs 402 and the second set of graphs 422 are not a good match then at 434, generation of the first graph statistics 406 and the generation of the second set of graphs 422 may be revaluated.

Figure 5:
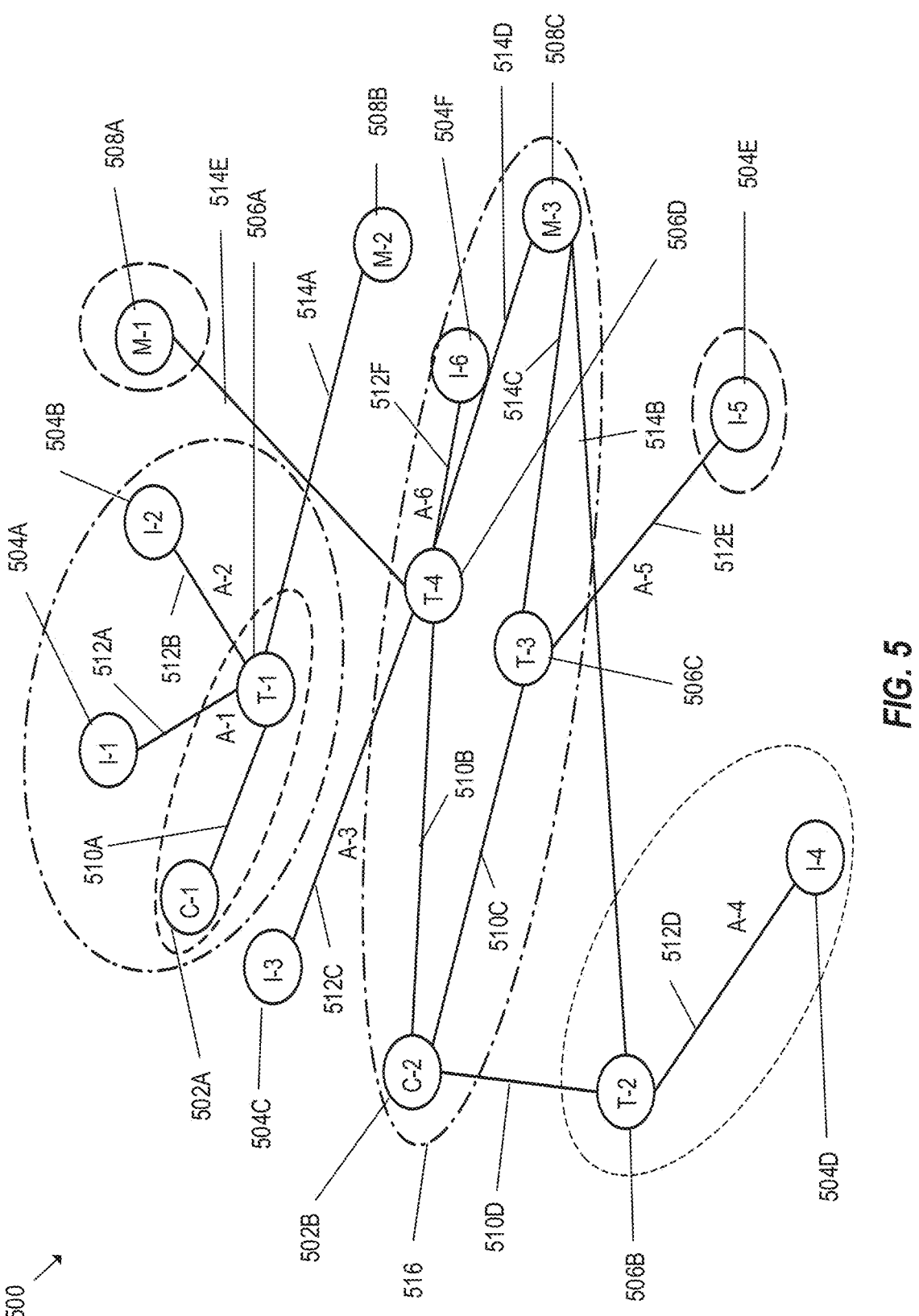
FIG. 5 is a diagram that illustrates an exemplary first graph database.

FIG. 5 is a diagram that illustrates an exemplary first graph database, in accordance with at least one embodiment described in the present disclosure. FIG. 5 is described in conjunction with elements from FIG. 1, FIG. 2, FIG. 3, FIG. 4A, and FIG. 4B. With reference to FIG. 5, there is shown an exemplary first graph database 500. The exemplary first graph database 500 may include a first node-type, a second node-type, a third node-type, a fourth node-type, a first edge-type, a second edge-type, and a third edge-type. In an example, the identified set of node-types associated with the first graph database 500 may correspond to at least one of: a customer node-type, a merchant node-type, a transaction node-type, or an item node-type. Further, the identified set of edge-types associated with the first graph database 500 may include an amount edge-type.

It may be noted that first graph database may have millions of nodes and edges. The four numbers of node-types and three numbers of edge-types shown in FIG. 5 is presented merely as an example. The first graph database 500 may include only one or more than four numbers of node types and three numbers of edge types, without deviation from the scope of the disclosure. For the sake of brevity, only four numbers of node-types and three numbers of edge-types have been shown in FIG. 5. However, in some embodiments, there may be more than four numbers of node-types and three numbers of edge-types, without limiting the scope of the disclosure.

The first node-type may be client nodes such as, a client-1 (C-1) node 502A and a client-2 (C-2) node 502B. The second node-type may be item nodes such as, an item-1 (I-1) node 504A, an item-2 (I-2) node 504B, an item-3 (I-3) node 504C, an item-4 (I-4) node 504D, an item-5 (I-5) node 504E, and an item-6 (I-6) node 504F. The third node-type may be transaction nodes such as, a transaction-1 (T-1) node 506A, a transaction-2 (T-2) node 506B, a transaction-3 (T-3) node 506C, and a transaction-4 (T-4) node 506D. The fourth node-type may be merchant nodes such as, a merchant-1 (M-1) node 508A, a merchant-2 (M-2) node 508B, and a merchant-3 (M-3) node 508C. The first edge-type may connect the first node-type to the third node-type. Examples of the first edge-type may include an edge 510A, an edge 510B, an edge 510C, and an edge 510D. The second edge-type may connect the second node-type to the third node-type. Examples of the second edge-type may include an edge 512A, edge 512B, an edge 512C, an edge 512D, an edge 512E and an edge 512F. The third edge-type may connect the third node-type to the fourth node-type. Examples of the third edge-type may include an edge 514A, an edge 514B, an edge 514C, an edge 514D, and an edge 514E. The exemplary first graph database 500 further shows a set of combinations of edge-types connecting three node-types. For example, a client-transaction-merchant combination 516 is shown.

The four number of node-types (namely, the first node-type, the second node-type, the third node-type, and the fourth node-type) and the three number of edge-types (namely, the first edge-type, the second edge-type, and the third edge-type), shown in FIG. 5 is presented merely as an example. The exemplary first graph database 500 may include only one or more than one number of node-types and edge-types, without deviation from the scope of the disclosure.

As seen from FIG. 5, the edge-types may connect nodes to each other and may represent a presence of a relationship between the nodes. For example, the edge 510A may represent that the client-1 associated with the client-1 node 502A may perform the transaction-1 associated with the transaction-1 node 506A, and so on. The edge 512A may represent that the transaction-1 associated with transaction-1 node 506A may be performed for the item-1 associated with the item-1 node 504A, and so on. Further, the edge 514A may represent that the transaction-1 associated with the transaction-1 node 506A may be made with the merchant-2 associated with the merchant-2 node 508B, and so on.

It may be noted that the edge-types may or may not have associated attributes such as, an amount corresponding to an edge between a transaction and an item. For example, an amount-1 (A-1) may be an attribute associated with the edge 512A, an amount-2 (A-2) may be an attribute associated with the edge 512B, an amount-3 (A-3) may be an attribute associated with the edge 510B, and so on. For privacy purpose, identity of some node-types such as, client and merchant may not be shared outside an issuer (the remote site, for example, the first electronic device 102). However, there may be significant useful information such as, edges and attributes, in other components of the exemplary first graph database 500 that may be used by an external entity (e.g., a local site, for example, the second electronic device 104) to perform analysis and machine learning. Details of the exemplary first graph database 500 are further provided, for example, in FIG. 6A and FIG. 6B.

It should be noted that the first graph database 500 presented in FIG. 5 is for exemplary purpose and should not be construed to limit the scope of the disclosure.

FIGS. 6A and 6B are diagrams that collectively illustrate a flowchart of an example method for remote statistical generation of graphs for graph machine learning, in accordance with an embodiment of the disclosure. FIGS. 6A and 6B are described in conjunction with elements from FIG. 1, FIG. 2, FIG. 3, FIG. 4A, FIG. 4B and FIG. 5. With reference to FIG. 6A and FIG. 6B, there is shown a flowchart 600. The method illustrated in the flowchart 600 may start at block 602 and may be performed by any suitable system, apparatus, or device, such as by the example first electronic device 102 of FIG. 1 or the processor 204 of FIG. 2. Although illustrated with discrete blocks, the steps and operations associated with one or more of the blocks of the flowchart 600 may be divided into additional blocks, combined into fewer blocks, or eliminated, depending on the particular implementation.

At block 602, the first graph may be retrieved from a graph database, such as the graph database 108. The processor 204 may be configured to retrieve the first set of graphs 402 from the graph database 108. Herein, the retrieved first set of graphs 402 may be associated with one or more of, but not limited to, a banking entity, financial transactions, a credit card issuer, medical records, a social network. The retrieved first set of graphs 402 may include a plurality of nodes and edges. Nodes may be vertices of the retrieved first set of graphs 402 and may be associated with entities such as, clients, merchants, items, banks, people, transactions, and the like. The edges may depict relationships between nodes. Each edge may connect one pair of node. However, in some cases edges may be self-directed i.e., the edge may connect one node itself. Moreover, edges may or may not include attributes. The processor 204 may store the retrieved first set of graphs 402 to the memory 206.

At block 604, the schema associated with the retrieved first graph may be obtained from the graph database 108. It may be noted that identity of certain node types may not be shared outside the graph database 108 for privacy issues. For example, for the retrieved first set of graphs 402 associated with one or more of, a banking entity, financial transactions, or a credit card issuer; client names, amount of transactions, and merchant names, respectively may not be shared to protect privacy. Similarly, for the retrieved first set of graphs 402 associated with medical records, name of patients, doctors and the like may not be shared. However, there may be significant useful information in other components of the retrieved first set of graphs 402 such as, edges and attributes that may be used by the external IT partners to perform analysis and machine learning. The schema associated with the retrieved first graph may correspond to a structure of the retrieved first set of graphs 402 and certain nodes such as, the client and the merchant may be anonymized. It may be noted graph queries may be executed on the graph database 108 to retrieve necessary information, such as, the schema of the first set of graphs 402, also known as a knowledge graph when data associated with the first set of graphs 402 is stored in a format other than that of a graph database. In an example, if the retrieved first set of graphs 402 is stored as multiple table of nodes and edges, then table headers may be joined and filtered to obtain information such as, the schema related to the retrieved first set of graphs 402.

At block 606, the set of node-types associated with the retrieved first graph may be obtained based on the obtained schema. The processor 204 may be configured to obtain the set of node-types associated with the retrieved first graph based on the obtained schema. The set of node-types may be retrieved directly from the schema of the retrieved first graph, such as, the first set of graphs 402. With reference to FIG. 5, the set of node-types associated with the retrieved first graph may be obtained as the first node-type, the second-node type, the third node-type and the fourth node-type. The first node-type may be client nodes. The second node-type may be item nodes. The third node-type may be transaction nodes. The fourth node-type may be merchant nodes.

At block 608, the first count of each of the identified set of node-types may be determined. The processor 204 may be configured to determine the first count of each of the identified set of node-types. The first count of the node-type may be a number of nodes of the corresponding node-type in the first graph such as, the first set of graphs 402. A node query may be performed on the retrieved first graph to determine each node-type list. The first count of each of the identified set of node-types may be determined by taking an aggregate of a length of list nodes for node-type. With reference to FIG. 5, as the first node-type may include client-1 node 502A and the client-2 node 502B, the first count of the first node-type may be "2". Similarly, the first count of the second node-type, the third node-type, and the fourth node-type may be "6", "4", and "3" respectively.

At block 610, the first statistical information associated with the retrieved first graph may be determined based on the determined first count. The processor 204 may be configured to determine the first statistical information associated with the retrieved first set of graphs 402 based on the determined first count. As discussed, the first statistical information associated with the retrieved first graph may be associated with the level-1 of the first graph. Herein, the level-1 may include the set of node-types associated with the retrieved first set of graphs 402 and the first statistical information may be obtained based on the first count of each of the node-type. With reference to the FIG. 5, the first statistical information associated with the first graph database 500 may be 2, 6, 4 and '3' for the first node-type, the second node-type, the third node-type, and the fourth node-type, respectively. Thus, the first statistical information may include the values "2", "6", "4", and "3" and the respective node-type identifiers, such as, "node-type 1", "node-type 2", node-type 3", and "node-type 4".

At block 612, the set of edge-types associated with the retrieved first graph may be identified based on the obtained schema. The processor 204 may be configured to identify the set of edge-types associated with the retrieved first set of graphs 402, based on the obtained schema. As discussed, the first graph such as the first set of graphs 402 may include different edge-types based on different pairs of node-types that the corresponding edge-type may connect. With reference to FIG. 5, the set of edge-types associated with the retrieved first graph database 500 may be the first edge-type, the second edge-type, and the third edge-type. The first edge-type may connect the first node-type, that is, the client nodes, to the third node-type that is, the transaction nodes. The instances of first edge-type may include the edge 510A, the edge 510B, the edge 510C, and the edge 510D. The second edge-type may connect the second node-type, that is, the item nodes to the third node-type, that is, the transaction nodes. The instances of the second edge-type may include the edge 512A, the edge 512B, the edge 512C, the edge 512D, the edge 512E and the edge 512F. The third edge-type may connect the third node-type that is, the transaction nodes, to the fourth node-type merchant nodes. The instances of the third edge-type may include the edge 514A, the edge 514B, the edge 514C, the edge 514D, and the edge 514E. The processor 204 may identify the set of edge-types associated with the retrieved first graph database 500 directly from the obtained schema. In an example, the identified set of node-types of the retrieved first graph database 500 may correspond to at least one of: a customer node-type, a merchant node-type, a transaction node-type, or an item node-type, and the identified set of edge-types of the retrieved first graph database 500 may include an amount edge-type.

At block 614, the second count of each of the identified set of edge-types may be determined. The processor 204 may be configured determine to the second count of each of the identified set of edge-types. The second count of the edge-type may be a number of edges of the corresponding edge-type. Herein, a list of edges of each of the identified set of edge-types may be obtained based on an execution of an edge-query for each edge-type on the retrieved first graph. The second count of each of the identified set of edge-types may be determined based on an aggregation of a length of the list edge-type for each edge-type. With reference to the FIG. 5, as the first edge-type may include the edge 510A, the edge 510B, the edge 510C, and the edge 510D, and this the second count of the first-edge type may be '4'. Similarly, the second count of the second edge-type and the third edge-type may be '6' and '5', respectively.

At block 616, the two-dimensional (2D) distribution of each of the identified set of edge-types may be determined, based on the identified set of edge-types and the identified set of node-types. The processor 204 may be configured to determine the two-dimensional (2D) distribution of each of the identified set of edge-types based on the identified set of edge-types and the identified set of node-types. The 2D distribution for each edge-type may be determined based on a calculation of a distribution between lists of the nodes for given two node-types that may be connected by an edge. The 2D distribution may be determined based on a representation of identifiers (IDs) of a node-type along one axis and a count of number of nodes of each ID connected to another node-type along another axis. For example, with reference to FIG. 5, the 2D distribution of the first node-type may be determined by taking the first-node type such as, the client-1 node 502A and the client-2 node 502B along a first axis and the count of the third node-type along a second axis. Herein, the client-1 node 502A may be connected to one transaction node and the client-2 node 502B may be connected to three transaction nodes. Similarly, the 2D distribution of each of the identified set of edge-types may be determined. An example of the 2D distribution associated with the retrieved first graph is provided, for example, in FIG. 7.

At block 618, the second statistical information associated with the retrieved first graph may be determined based on the determined second count and the determined 2D distribution. The processor 204 may be configured to determine the second statistical information associated with the retrieved first graph based on the determined second count and the determined 2D distribution. The second statistical information may provide statistical information pertaining to the level-2 of the retrieved first graph, such as the first set of graphs 402. The level-2 may include all pairs of nodes of different node types that may be connected with the edge such as, client-transaction edge, transaction-item edge and the like. Details of the second statistical information are further provided, for example, in FIG. 9.

At block 620, the set of combinations of edge-types connecting three node-types from the retrieved first graph may be identified, based on the obtained schema. The processor 204 may be configured to identify the set of combinations of edge-types connecting three node-types from the retrieved first graph based on the obtained schema. The set of combinations of edge-types connecting three node-types may be identified directly from the schema of the retrieved first graph such as, the first set of graphs 402. The set of combinations of edge-types connecting three node-types may be used to determine a possibility for a two-hop connection between node-types. For example, with reference to FIG. 5, the set of combinations of edge-types connecting the three node-types may be the client-transaction-merchant combination 516, an item-transaction-merchant combination, and the like. The client-transaction-merchant combination 516 may include a first client-transaction-merchant combination and a second client, which may include the client-2 node 502B, the transaction-4 node 506D and the merchant-3 node 508C. A second client-transaction-merchant combination may include the client-2 node 502B, the transaction-3 node 506C and the merchant-3 node 508C.

At block 622, the third count of each of the set of three node-type groups may be determined from the retrieved first graph based on the identified set of combinations. The processor 204 may be configured to determine the third count of each of the set of three node-type groups from the retrieved first graph based on the identified set of combinations. Herein, the third count may be a number of three node-type groups for each set of three node-type groups. For example, a query for retrieval of a list of each three node-type group from the retrieved first graph may be executed on the first graph. The query may correspond to a three node and two edge query for each of the set of three node-type groups. Further, the third count of each of the set of three node-type groups may be obtained based on an aggregation of the length of list each of the set of three node-type groups. For example, with reference to FIG. 5, the client-transaction-merchant combinations that may connect the client-2 node 502B and the merchant-3 node 508C, via a transaction-node may include the first client-transaction-merchant combination and the second client-transaction-merchant combination. The first client-transaction-merchant combination may include the client-2 node 502B, transaction-4 node 506D and merchant-3 node 508. Further, the second client-transaction-merchant combination may include the client-2 node 502B, the transaction-3 node 506C and the merchant-3 node 508C. Hence, the third count of the client-transaction-merchant combinations may be two. Similarly, the third count of each of the set of three node-type groups may be determined.

At block 624, the three-dimensional (3D) distribution of each of the set of three node-type groups may be determined, based on the determined third count and the identified set of combinations. The processor 204 may be configured to determine the three-dimensional (3D) distribution of each of the set of three node-type groups based on the determined third count and the identified set of combinations. The 3D distribution may be determined by taking each node-type of a given three node-type group on different axis. For example, the first node-type may be taken along an 'X' axis, the second node-type may be taken along a 'Y' axis, and the third node-type may be taken along a 'Z' axis. For a given ID of the first node-type and a given ID of the second node-type, a number of the third node-types connected may be determined and taken along the 'Z' axis to obtain the 3D distribution. Alternatively, the 3D distribution may be determined based on a representation of the first node-type along the 'X' axis and the second node-type along the 'Y' axis. Herein, a number of graphs may be determined for each ID of the third-node type. In other words, two node-types may be selected for 'X' and 'Y' axis and one node type may be selected for 'Z' axis. A largest count node-type in each of the set of three node-type groups may be selected for more voluminous distribution. The 3D distribution for each of the set of three node-type groups may be determined by calculating a distribution between a grid of nodes along 'X' and 'Y' axis against lists of nodes on the 'Z' axis, in each of the set of three node-type groups. Details of the 3D are further provided, for example, in FIG. 8.

At block 626, the third statistical information associated with the retrieved first graph may be determined based on the determined third count and the determined 3D distribution. The processor 204 may be configured to determine the third statistical information associated with the retrieved first graph based on the determined third count and the determined 3D distribution. It may be noted that the third statistical information may be statistical information related to the level-3 of the retrieved first graph. Herein, the level-3 may include all groups of nodes of three different node types that may be connected such as, a client-transaction-merchant group, a client-transaction-item group, and the like. Details of the third statistical information are further provided, for example, in FIG. 11.

At block 628, the first graph statistics associated with the retrieved first graph may be transmitted to the second electronic device 104. The transmitted first graph statistics may include the determined first statistical information, the determined second statistical information, and the determined third statistical information. The processor 204 may be configured to transmit the first graph statistics associated with the retrieved first graph to the second electronic device 104. The first graph statistics may be a combination of the determined first statistical information, the determined second statistical information, and the determined third statistical information. The first graph statistics may be an aggregated statistics that may be calculated so that the determined first statistical information, the determined second statistical information, and the determined third statistical information may not need be sent separately. For example, the first graph statistics may include an edge-node saturation and an edge-node ratio. The edge-node saturation for each edge-type may denote what percentages of the nodes in two node-types are present. For example, the edge-node saturation of '99' percentage may denote that ninety-nine percentage of all transactions are in transaction-merchant edge, but only fifty percentage of all merchants are in a same edge. The edge-node ratio may be denoted for each edge-type based on a number of one type of node that may be connected to the other types of node. For example, each client node may be connected to '326' transaction nodes on an average. With reference to FIG. 1, the first electronic device 102 may transmit the first graph statistics to the second electronic device 104, via the communication network 110.

At block 630, the second graph representative of the retrieved first graph may be generated by the second electronic device 104 based on the transmitted first graph statistics. The processor 304 may be configured to generate the second graph representative of the retrieved first graph based on the transmitted first graph statistics. The second set of graphs 422 may be generated based on the first statistical information, the second statistical information, and the third statistical information. The generation of the second set of graphs 422 is described further, for example, in FIGS. 15, 16, 17, and 18. Control may pass to end.

Although the flowchart 600 is illustrated as discrete operations, such as 602, 604, 606, 608, 610, 612, 614, 616, 618, 620, 622, 624, 626, 628, and 630. However, in certain embodiments, such discrete operations may be further divided into additional operations, combined into fewer operations, or eliminated, depending on the particular implementation without detracting from the essence of the disclosed embodiments.

FIG. 7 is a diagram that illustrates an exemplary scenario of an exemplary two-dimensional (2D) distribution of a set of edge-types of a first graph, in accordance with at least one embodiment described in the present disclosure. FIG. 7 is described in conjunction with elements from FIG. 1, FIG. 2, FIG. 3, FIG. 4A, FIG. 4B, FIG. 5, FIG. 6A and FIG. 6B. With reference to FIG. 7, there is shown an exemplary scenario 700. The scenario 700 includes an exemplary 2D distribution 702. The 2D distribution 702 may be divided to a set of spikes 704, a set of outliers 706, and a set of regulars 708. The set of spikes 704 may include a data point 704A and a data point 704B. The set of outliers 706 may include a data point 706A, a data point 706B, a data point 706C, a data point 706D, a data point 706E, data point 706F, a data point 706G, and a data point 706H. The 2D distribution 702 may be determined by the first electronic device 102 or the processor 204 of the first electronic device 102 of the present disclosure.

The 2D distribution 702 may be determined based on a representation of each node of a node-type 1 along an 'X' axis and node-type 2 count along a 'Y' axis. In other words, for each ID of the node-type 1, a number of the node-type 2 that may be connected to the corresponding ID of the node-type 1 may be plotted to construct the 2D distribution 702. Further the 2D distribution 702 may divided into the set of spikes 704, the set of outliers 706, and the set of regulars 708.

It may be noted that with large number of nodes of each node-type in the first graph such as, the first set of graphs 402, a transfer of the complete first statistical information from the remote site such as, the first electronic device 102, to the local site such as, the second electronic device 104, may be inefficient. The first statistical information may be effectively reduced in size without excessive loss of information based on a division of the 2D distribution 702 into the set of spikes 704, the set of outliers 706, and the set of regulars 708 so that the second graph may be generated with enough fidelity for graphical machine learning. Details of the spikes, the outliers, and the regulars are further provided, for example, in FIG. 9.

It should be noted that the exemplary scenario 700 of the FIG. 7 is for exemplary purposes and should not be construed to limit the scope of the disclosure.

Figure 8:
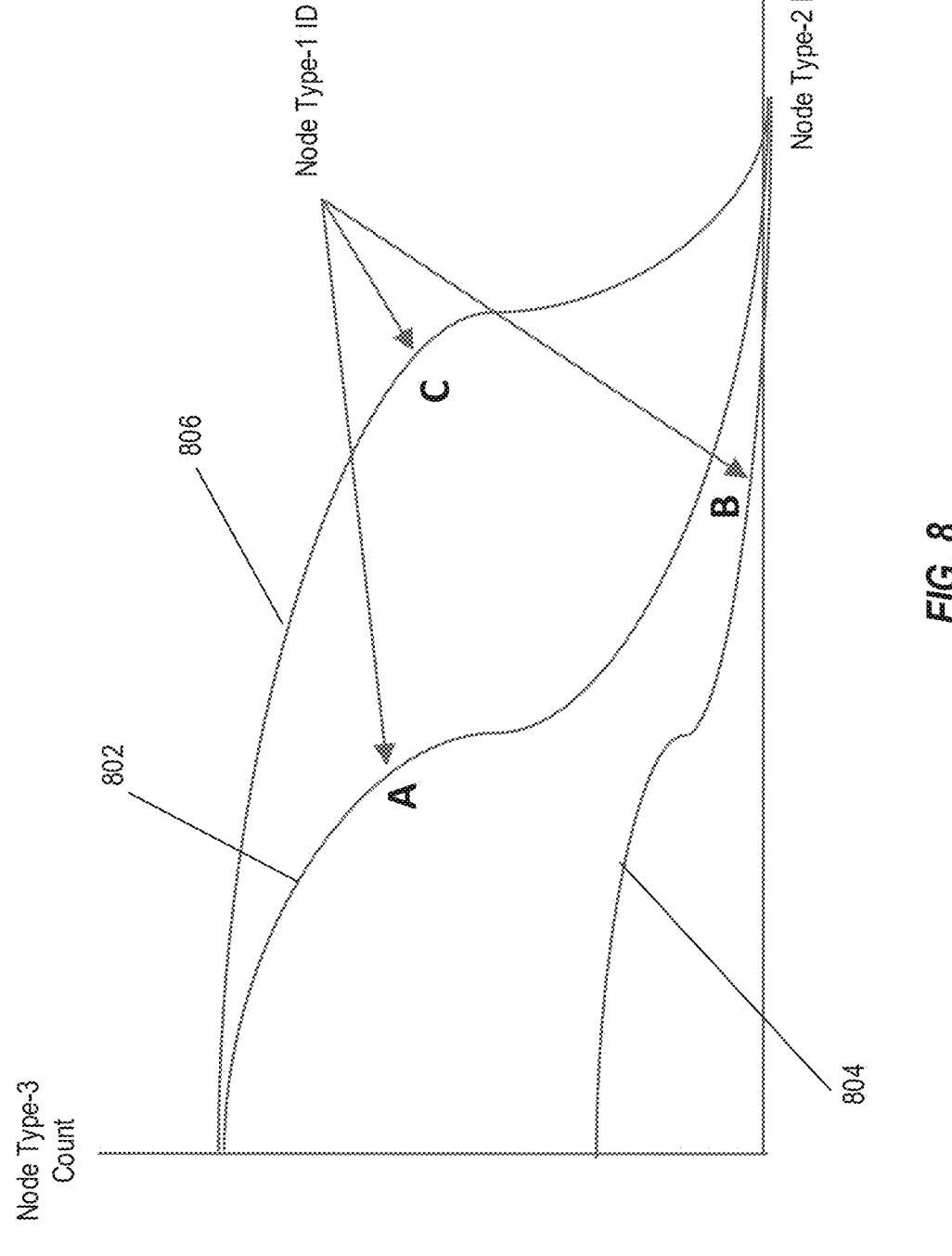
FIG. 8 is a diagram that illustrates an exemplary scenario of exemplary three-dimensional (3D) distributions of a set of three node-type groups of a first graph.

FIG. 8 is a diagram that illustrates an exemplary scenario of exemplary three-dimensional (3D) distributions of a set of three node-type groups of a first graph, in accordance with at least one embodiment described in the present disclosure. FIG. 8 is described in conjunction with elements from FIG. 1, FIG. 2, FIG. 3, FIG. 4A, FIG. 4B, FIG. 5, FIG. 6A, FIG. 6B, and FIG. 7. With reference to FIG. 8, there is shown an exemplary scenario 800. The scenario 800 comprises a 3D distribution 802, a 3D distribution 804, and a 3D distribution 806. The first electronic device 102 or the processor 204 may execute a set of operations associated with the scenario 800, as described herein.

The 3D distribution 802, the 3D distribution 804, and the 3D distribution 806 may be represented based on a selection of different nodes of a particular node-type and mapping of a distribution of the third counts of the other two node-types taken along the 'X' axis and the 'Y' axis. The 3D distribution 802, the 3D distribution 804, and the 3D distribution 806 are plotted based on a representation of IDs of the node-type 2 along the 'X' axis and counts of the node-type 3 along 'Y' axis. The 3D distribution 802 may be plotted for the node-type 1 having ID 'A', The 3D distribution 804, may be plotted for the node-type 1 having ID 'B' and the 3D distribution 806 may be plotted for the node-type 1 having ID 'C'. For example, the 3D distribution 802 may be plotted for the node-type 1 having ID 'A' based on a determination of a number of nodes of node-type 3 that may be connected to each node (that may be differentiated by IDs) of node-type 2. Details of the 3D distribution are further provided, for example, in FIG. 11.

It should be noted that the exemplary scenario 800 of the FIG. 8 is for exemplary purposes and should not be construed to limit the scope of the disclosure.

FIG. 9 is a diagram that illustrates a flowchart of an example method for determination of spikes, outliers, and regulars associated with two-dimensional (2D) distributions of set of edge-types identified from a retrieved first graph, in accordance with an embodiment of the disclosure. FIG. 9 is described in conjunction with elements from FIG. 1, FIG. 2, FIG. 3, FIG. 4A, FIG. 4B, FIG. 5, FIG. 6A, FIG. 6B, FIG. 7, and FIG. 8. With reference to FIG. 9, there is shown a flowchart 900. The method illustrated in the flowchart 900 may start at 902 and may be performed by any suitable system, apparatus, or device, such as by the example first electronic device 102 of FIG. 1 or the processor 204 of FIG. 2. Although illustrated with discrete blocks, the steps and operations associated with one or more of the blocks of the flowchart 900 may be divided into additional blocks, combined into fewer blocks, or eliminated, depending on the particular implementation.

At block 902, the determined 2D distributions may be divided into spikes, outliers, and regulars. The processor 204 may be configured to divide the determined 2D distributions into the spikes, the outliers, and the regulars. In an embodiment, the spikes may correspond to a set of first nodes of the retrieved first graph, such that a number of the set of first nodes may be below a first threshold and the determined second count corresponding to the set of first nodes may be above a second threshold. Further, the outliers may correspond to a set of second nodes of the retrieved first graph, such that a number of the set of second nodes may be above a third threshold and the determined second count corresponding to the set of second nodes may be below a fourth threshold. Also, the regulars may correspond to a set of third nodes of the retrieved first graph, such that the set of third nodes may include nodes other than the set of first nodes and the set of second nodes of the retrieved first graph.

For example, the spikes (e.g., the set of first nodes) may be a small number of nodes (where the number of such nodes may be less than the first threshold) that may have a significantly large count (i.e., the second count of such nodes being greater than the second threshold) as compared to other nodes. Herein, the first threshold may correspond to a statistically small number (e.g., 1-2%) of nodes as compared to the total number of nodes of the retrieved first graph. Further, the second threshold may correspond to a count value that may be larger than a statistically significant number (e.g., 97.6 percentile) of count values of other nodes of the retrieved first graph. The spikes may correspond to second count values that may be 'unknown', 'others' or similarly non-specific.

In an example, the outliers (e.g., the set of second nodes) may include a large number of nodes (where the number of such nodes may be greater than the third threshold) with considerably small second counts (i.e., the second count of such nodes being less than the fourth threshold) than other nodes. Herein, the third threshold may correspond to a statistically large number (e.g., 95%) of nodes as compared to the total number of nodes of the retrieved first graph. Further, the fourth threshold may correspond to a count value that may be smaller than a statistically significant number (e.g., 97.6 percentile) of count values of other nodes of the retrieved first graph. The outliers may correspond to the second count values that may be too specific, and may be sparsely connected to other nodes.

As an example, the regulars may be rest of the data (which may include nodes in the retrieved first graph, other than the set of first nodes and the set of second nodes). Each such regular node may have a statistically significant share of the remaining counts. For example, more than 90% of the total second count value may be contributed by the second counts associated with the nodes of the regulars category.

For example, the retrieved first graph may correspond to one of a banking entity, financial transactions, or a credit card issuer entity. As an example, an edge-type may correspond to an amount edge-type that may represent an amount associated with a transaction node and an item node. In other words, the amount edge-type may represent a price at which an item associated with the item node may be purchased or sold through a transaction associated with the transaction node. Information related to transactions in the retrieved first graph may include a small number (i.e., the first threshold) of a set of first transactions with a very high amount (i.e., the second threshold), such as, high-valued transactions. For example, transactions associated with a purchase of a property, a vehicle, or other high-valued items may belong to the set of first transactions. Nodes (e.g., relevant item and transaction nodes) related to such set of first transactions may correspond to spikes related to the amount edge-type. Further, information related to transactions in the retrieved first graph may include a large number (i.e., the third threshold) of a set of second transactions with a very small amount (i.e., the fourth threshold), such as, low-valued transactions. For example, transactions associated with daily expenditure of a family on food and groceries may belong to the set of second transactions. Nodes (e.g., relevant item and transaction nodes) related to such set of second transactions may correspond to outliers related to the amount edge-type. The transactions other than the set of first transactions and the set of second transactions may correspond to the regulars. A total contribution of the regular transactions may have a statistically significant contribution (e.g., 90%) to the overall second count for the edge-type "amount".

Similarly, the spikes, the outliers, and the regulars, may be determined in scenarios where the retrieved first graph corresponds to medical records associated with a healthcare entity, an e-commerce domain, a social networking domain, an education domain, or personally identifiable information associated with children.

The spikes and the outliers may distort a distribution to model data statistically, and hence, the spikes and the outliers may be separated out so that distribution of the regulars may be captured as a histogram to reduce volume of the second statistical information. With reference to FIG. 7, the set of spikes 704 may include IDs of the node-type 1 that may be connected to a large number of the node-type 2, the set of outliers 706 may include IDs of the node-type 1 that may be connected to a small number of the node-type 2, and the set of regulars 708 may be the rest of the node-type 1 that may not be included in the set of spikes 704 or the set of outliers 706.

It may be noted that the 2D distribution between nodes in the level-2 may need to be processed so that different parts of the 2D distribution may be modeled more precisely, and amount of information for transfer may be reduced. An end goal may be an ability to sufficiently recreate the 2D distribution for the second graph generation.

At block 904, properties of the spikes may be identified. The processor 204 may be configured to identify the properties of the spikes. The properties of the spikes may be IDs of node included in spikes, node-types of nodes present in the spikes, the second count for each node present in spikes, and the like. With reference to FIG. 7, the properties of the spikes may include an absolute count of nodes of node-type 2 connected to each ID of node-type 1 present in the spikes. Since there may be only few spikes, hence, the identification of properties of the spikes may be space effective.

At block 906, a list of the spikes may be determined based on the identified properties of the spikes. The processor 204 may be configured to determine the list of the spikes based on the identified properties of the spikes. The list of the spikes may include node-type IDs that may correspond to spikes. For example, with reference to FIG. 7, the list of the spikes may include the node-type 1 ID associated with the data point 704A and the node-type 1 ID associated with the data point 704B.

At block 908, properties of the outliers may be identified. The processor 204 may be configured to identify the properties of the outliers. The properties of the outliners may be IDs of nodes included in outliers, node-type of nodes present in the outliers, the second count for each node present in outliers, and the like. With reference to FIG. 7, the properties of the outliners may include an absolute count of nodes of node-type 2 connected to each ID of node-type 1 present in the outliers. Since there may be only few outliers, hence, the identification of the properties of the outliers may be space effective.

At block 910, a list of the outliers may be determined based on the identified properties of the outliers. The processor 204 may be configured to determine the list of the outliers based on the identified properties of the outliers. The list of the outliers may include node-type IDs that may be outliers. For example, with reference to FIG. 7, the list of the outliers may include the node-type 1 IDs associated with the data point 706A, the data point 706B, the data point 706C, the data point 706D, the data point 706E, the data point 706F, the data point 706G, and the data point 706H. Control may pass to end.

Although the flowchart 900 is illustrated as discrete operations, such as 902, 904, 906, 908, and 910. However, in certain embodiments, such discrete operations may be further divided into additional operations, combined into fewer operations, or eliminated, depending on the particular implementation without detracting from the essence of the disclosed embodiments.

Figure 10:
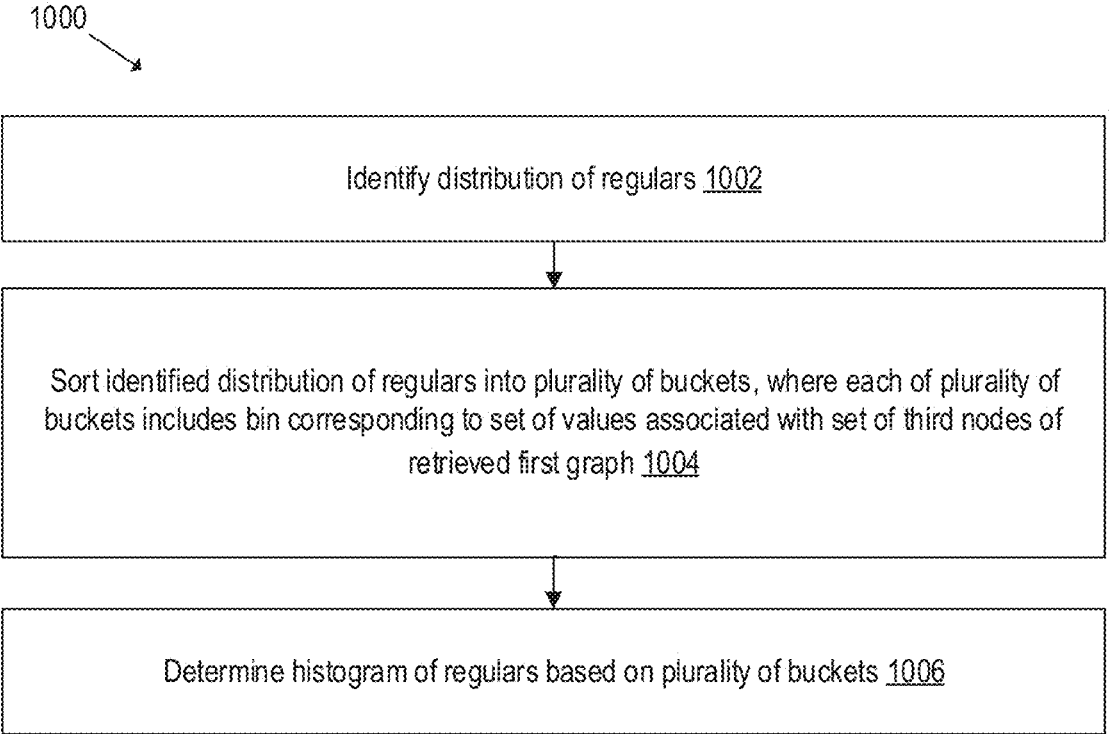
FIG. 10 is a diagram that illustrates a flowchart of an example method for determination of histograms of regulars associated with two-dimensional (2D) distributions of set of edge-types identified from a retrieved first graph.

FIG. 10 is a diagram that illustrates a flowchart of an example method for determination of histograms of regulars associated with two-dimensional (2D) distributions of set of edge-types identified from a retrieved first graph, in accordance with an embodiment of the disclosure. FIG. 10 is described in conjunction with elements from FIG. 1, FIG. 2, FIG. 3, FIG. 4A, FIG. 4B, FIG. 5, FIG. 6A, FIG. 6B, FIG. 7, FIG. 8, and FIG. 9. With reference to FIG. 10, there is shown a flowchart 1000. The method illustrated in the flowchart 1000 may start at 1002 and may be performed by any suitable system, apparatus, or device, such as by the example first electronic device 102 of FIG. 1 or the processor 204 of FIG. 2. Although illustrated with discrete blocks, the steps and operations associated with one or more of the blocks of the flowchart 1000 may be divided into additional blocks, combined into fewer blocks, or eliminated, depending on the particular implementation.

At block 1002, a distribution of the regulars may be identified. The processor 204 may be configured to identify the distribution of the regulars. For example, with reference to FIG. 7 the distribution of the set of regulars 708 may be identified as a decaying exponential distribution, such as the 2D distribution 702.

At block 1004, the identified distribution of the regulars may be sorted into a plurality of buckets. The processor 204 may be configured to sort the identified distribution of the regulars into the plurality of buckets. In an embodiment, each of the plurality of buckets may include a bin corresponding to a set of values associated with the set of third nodes (i.e., the nodes corresponding to the regulars) of the retrieved first graph. As, the regulars may include a combination of large number of nodes with large second counts, in order to store information pertaining to the regulars effectively, the regulars may be split into the plurality of buckets (or bins), for example, of '10' nodes each. Each such bin may include a value associated with each node included in the particular bin. A boundary of each bucket and IDs of nodes present in each bucket may be stored.

For example, the retrieved first graph may correspond to one of a banking entity, financial transactions, or a credit card issuer entity. As an example, an edge-type may correspond to an amount edge-type that may represent an amount associated with a transaction node and an item node. In other words, the amount edge-type may represent a price at which an item associated with the item node may be purchased or sold through a transaction associated with the transaction node. In an embodiment, the plurality of buckets may correspond to at least one of: a type of transacting entity, a type of a financial transaction, or a value of a financial transaction. In an example, the plurality of buckets may be created based on types of transacting entities, such as, but not limited to, transactions between financial institutions, transactions between businesses, or transactions between customers. In another example, the plurality of buckets may be created based on types of financial transactions, such as, but not limited to, sales, purchases, receipts, or payments. In another example, the plurality of buckets may be created based on values of financial transactions, such as, but not limited to, low-valued transactions, medium-valued transactions, and high-valued transactions.

At block 1006, a histogram of the regulars may be determined based on the plurality of buckets. The processor 204 may be configured to determine the histogram of the regulars based on the plurality of buckets. The histogram of the regulars may be drawn based on the plurality of buckets based on a representation of each of the plurality of buckets on one axis and a total number nodes for each bucket along another axis. The histogram of the regulars may save space as compared to the distribution of the regulars itself. It may be noted that the combined results of steps 904, 908 and 1002 of FIGS. 9 and 10 may reduce amount of data that may need to be transmitted from the remote site while keeping a faithful reproduction of the first graph statistics possible. Control may pass to end.

Although the flowchart 1000 is illustrated as discrete operations, such as 1002, 1004, and 1006. However, in certain embodiments, such discrete operations may be further divided into additional operations, combined into fewer operations, or eliminated, depending on the particular implementation without detracting from the essence of the disclosed embodiments.

FIG. 11 is a diagram that illustrates a flowchart of an example method for determination of third statistical information of a retrieved first graph, in accordance with an embodiment of the disclosure. FIG. 11 is described in conjunction with elements from FIG. 1, FIG. 2, FIG. 3, FIG. 4A, FIG. 4B, FIG. 5, FIG. 6A, FIG. 6B, FIG. 7, FIG. 8, FIG. 9, and FIG. 10. With reference to FIG. 11, there is shown a flowchart 1100. The method illustrated in the flowchart 1100 may start at 1102 and may be performed by any suitable system, apparatus, or device, such as by the example first electronic device 102 of FIG. 1 or the processor 204 of FIG. 2. Although illustrated with discrete blocks, the steps and operations associated with one or more of the blocks of the flowchart 1100 may be divided into additional blocks, combined into fewer blocks, or eliminated, depending on the particular implementation.

At block 1102, a node-type may be selected from the identified set of node-types. The processor 204 may be configured to select the node-type from the identified set of node-types. Herein, the node-type may be selected for representation between the 'X' axis and the 'Y' axis in the 3D distribution. By default, the node-type with more values or highest third count may be selected for more precise correlation measurement and to yield fewer distribution classes. In an example, the selected node-type may be client nodes.

It may be noted that the level-3 statistics may include multiple 3D distributions that may be required to be transferred from the remote site (such as, the first electronic device 102) to the local site (such as, the second electronic device 104) that may severely limit an effectiveness of remote data transfer. Hence, the 3D distribution between three node groups in the level-3 statistics may need to be processed so that similar 3D distributions may be grouped together as distribution classes. Data reduction techniques for level-2 information may be then applied to each distribution class.

At block 1104, an identifier (ID) of the selected node-type with a highest count may be identified. The processor 204 may be configured to identify the identifier (ID) of the selected node-type with the highest count. The use of the identifier (ID) of the selected node-type with the highest count as a starting point may ensure the distribution classes with higher number of total counts may be separated out first. In an example, the selected node-type may be client nodes and the selected ID with the highest count may be "1". Thus, the ID of the selected node-type with the highest count may be "client-1".

At block 1106, node correlation coefficients of the 2D distributions associated with the identified ID of the selected node-type may be determined against the 2D distributions associated with a set of IDs of the selected node-type. The processor 204 may be configured to determine node correlation coefficients of the 2D distributions associated with the identified ID of the selected node-type against the 2D distributions associated with the set of IDs of the selected node-type. The node correlation coefficient may determine a degree of similarity or association between two variables. In an embodiment, Pearson Correlation coefficient may be used as the node correlation coefficient. The Pearson Correlation coefficient may be a good measurement of similarity as the Pearson Correlation coefficient may be immune to both offset and range variations in the 3D distribution.

At block 1108, the determined node correlation coefficients of the 2D distributions associated with the identified ID of the selected node-type may be compared against the 2D distributions associated with the set of IDs of the selected node-type, with a threshold. The processor 204 may be configured to compare the determine the node correlation coefficients of the 2D distributions associated with the identified ID of the selected node-type against the 2D distributions associated with the set of IDs of the selected node-type, with the threshold. Herein, the threshold may be a value that may be used to determine whether the identified ID of the selected node-type and the corresponding ID of the set of IDs are correlated or similar. The determination of the third statistical information associated with the retrieved first graph is described further, for example, in FIG. 12. Control may pass to end.

Although the flowchart 1100 is illustrated as discrete operations, such as 1102, 1104, 1106, and 1108. However, in certain embodiments, such discrete operations may be further divided into additional operations, combined into fewer operations, or eliminated, depending on the particular implementation without detracting from the essence of the disclosed embodiments.

FIG. 12 is a diagram that illustrates a flowchart of an example method for determination of third statistical information of a retrieved first graph, in accordance with an embodiment of the disclosure. FIG. 12 is described in conjunction with elements from FIG. 1, FIG. 2, FIG. 3, FIG. 4A, FIG. 4B, FIG. 5, FIG. 6A, FIG. 6B, FIG. 7, FIG. 8, FIG. 9, FIG. 10, and FIG. 11. With reference to FIG. 12, there is shown a flowchart 1200. The method illustrated in the flowchart 1200 may start at 1202 and may be performed by any suitable system, apparatus, or device, such as by the example first electronic device 102 of FIG. 1 or the processor 204 of FIG. 2. Although illustrated with discrete blocks, the steps and operations associated with one or more of the blocks of the flowchart 1200 may be divided into additional blocks, combined into fewer blocks, or eliminated, depending on the particular implementation.

At block 1202, one or more first IDs of the set of IDs of the selected node-type may be added to a distribution class of a set of distribution classes, based on the node correlation coefficient of the 2D distributions associated with the identified ID against each of the one or more first IDs being greater than the threshold. Herein, each of the set of distribution classes may correspond to a set of 2D distributions from the 2D distribution of each of the identified set of edge-types. The processor 204 may be configured to add one or more first IDs of the set of IDs of the selected node-type to the distribution class of the set of distribution classes, based on the node correlation coefficient of the 2D distributions associated with the identified ID against each of the one or more first IDs being greater than the threshold. As the node correlation coefficient of the 2D distributions associated with the identified ID against each of the one or more first IDs of the set of IDs of the selected node-type may be greater than the threshold, say 0.7, the 3D distribution of the identified ID may be similar to the 3D distribution of each of the one or more first IDs of the set of IDs. Hence, the one or more first IDs of the set of IDs of the selected node-type may be added to the distribution class. With reference to FIG. 8, the 3D distribution 802 corresponding to the node-type 1 of ID 'A' and the 3D distribution 804 corresponding to the node-type 2 of ID 'B' may be similar and the correlation between them may be high and greater than the threshold. The 3D distribution 806 corresponding to the node-type 3 of ID 'C' may not be similar to the 3D distribution 802 corresponding to the node-type 1 of ID 'A' and the 3D distribution 804 corresponding to the node-type 2 of ID 'B'. Hence, the node-type 1 of ID 'A' and the node-type 2 of ID 'B' may be added to one distribution class and the node-type 3 of ID 'C' may be added to another distribution class.

At block 1204, an offset and a range of each node in the set of 2D distributions of each distribution class of the set of distribution classes may be determined. The processor 204 may be configured to determine the offset and the range of each node in the set of 2D distributions of each distribution class of the set of distribution classes. Herein, the offset may be a starting point of a 2D distribution of the node. The range may be a range of values for the 2D distribution. With reference to FIG. 8, the 3D distribution 802 corresponding to the node-type 1 of ID 'A' and the 3D distribution 804 corresponding the node-type 2 of ID 'B' may be present in the same distribution class. To reduce the volume of all 3D distributions including one 3D distribution per node in a node-type, the 3D distributions may be grouped into a number of distribution classes. Each distribution class may include a number of similar distributions, which may be determined as similar based on Pearson Correlation Coefficient, as described, for example, in FIG. 11. For each individual ID of the selected node-type, only the offset and the range may be stored so that corresponding approximate 2D distributions may be constructed at a time of generation of the second graph.

At block 1206, the set of 2D distributions of each distribution class may be normalized and averaged. The processor 204 may be configured to normalize and average the set of 2D distributions of each distribution class. Herein, each distribution class may be reduced to one representative distribution based on a normalization and averaging of the set of 2D distributions for the corresponding distribution class. With reference to FIG. 8, the distribution class corresponding to the node-type 1 of ID 'A' and the node-type 2 of ID 'B' may include one distribution, which may be obtained based on the normalization and averaging of the 3D distribution 802 and the 3D distribution 802. The 2D distribution, so obtained, may correspond to a representative distribute of the distribution class.

At block 1208, a list of distribution classes from the set of distribution classes, based on the normalizing and the averaging may be determined. Herein, each distribution class of the determined list of distribution classes may correspond to the representative distribute, a list of IDs, the offset, and the range. The processor 204 may be configured to determine the list of distribution classes from the set of distribution classes, based on the normalizing and the averaging. The list of distribution classes may include all distribution classes corresponding to the retrieved first graph. With reference to FIG. 8, the list of distribution classes may include a first distribution class corresponding to the node-type 1 of ID 'A' and the node-type 2 of ID 'B' and a second distribution class corresponding to the node-type 3 of ID 'C'. The determination of the third statistical information associated with the retrieved first graph is described further, for example, in FIG. 13. Control may pass to end.

Although the flowchart 1200 is illustrated as discrete operations, such as 1202, 1204, 1206, and 1208. However, in certain embodiments, such discrete operations may be further divided into additional operations, combined into fewer operations, or eliminated, depending on the particular implementation without detracting from the essence of the disclosed embodiments.

FIG. 13 is a diagram that illustrates a flowchart of an example method for determination of third statistical information of a retrieved first graph, in accordance with an embodiment of the disclosure. FIG. 13 is described in conjunction with elements from FIG. 1, FIG. 2, FIG. 3, FIG. 4A, FIG. 4B, FIG. 5, FIG. 6A, FIG. 6B, FIG. 7, FIG. 8, FIG. 9, FIG. 10, FIG. 11, and FIG. 12. With reference to FIG. 13, there is shown a flowchart 1300. The method illustrated in the flowchart 1300 may start at 1302 and may be performed by any suitable system, apparatus, or device such as by the example first electronic device 102 of FIG. 1 or the processor 204 of FIG. 2. Although illustrated with discrete blocks, the steps and operations associated with one or more of the blocks of the flowchart 1300 may be divided into additional blocks, combined into fewer blocks, or eliminated, depending on the particular implementation.

At block 1302, the representative distribute of each distribution class of the determined list of distribution classes may be divided into spikes, outliers, and regulars. The processor 204 may be configured to divide the representative distribute of each distribution class of the determined list of distribution classes into the spikes, the outliers, and the regulars. In an embodiment, the spikes may correspond to a set of first nodes of the representative distribute, such that a number of the set of first nodes may be below a first threshold and the determined second count corresponding to the set of first nodes may be above a second threshold. Further, the outliers may correspond to a set of second nodes of the representative distribute, such that a number of the set of second nodes may be above a third threshold and the determined second count corresponding to the set of second nodes may be below a fourth threshold. Also, the regulars may correspond to a set of third nodes of the representative distribute, such that the set of third nodes may include nodes other than the set of first nodes and the set of second nodes of the representative distribute.

For example, the spikes (e.g., the set of first nodes) may be a small number of nodes (where the number of such nodes may be less than the first threshold) that may have a significantly large count (i.e., the second count of such nodes being greater than the second threshold) as compared to other nodes. Herein, the first threshold may correspond to a statistically small number (e.g., 1-2%) of nodes as compared to the total number of nodes of the representative distribute. Further, the second threshold may correspond to a count value that may be larger than a statistically significant number (e.g., 97.6 percentile) of count values of other nodes of the representative distribute. The spikes may correspond to second count values that may be 'unknown', 'others' or similarly non-specific.

In an example, the outliers (e.g., the set of second nodes) may include a large number of nodes (where the number of such nodes may be greater than the third threshold) with considerably small second counts (i.e., the second count of such nodes being less than the fourth threshold) than other nodes. Herein, the third threshold may correspond to a statistically large number (e.g., 95%) of nodes as compared to the total number of nodes of the representative distribute. Further, the fourth threshold may correspond to a count value that may be smaller than a statistically significant number (e.g., 97.6 percentile) of count values of other nodes of the retrieved first graph. The outliers may correspond to the second count values that may be too specific, and may be sparsely connected to other nodes.

As an example, the regulars may be rest of the data (which may include nodes in the retrieved first graph, other than the set of first nodes and the set of second nodes). Each such regular node may have a statistically significant share of the remaining counts. For example, more than 90% of the total second count value may be contributed by the second counts associated with the nodes of the regulars category. As the representative distribute of each distribution class may be considered as 2D distribution, techniques for dividing the representative distribute of each distribution class into the spikes, the outliers, and the regulars may be similar, as explained in FIG. 9. Details of the division into spikes, outliers, and regulars are further provided, in FIG. 9 for example, at 902.

At block 1304, properties of spikes associated with the representative distribute of the corresponding distribution class of the determined list of distribution classes may be identified. The processor 204 may be configured to identify properties of spikes associated with the representative distribute of the corresponding distribution class of the determined list of distribution classes. The properties of the spikes may be IDs of node included in a spike, node-type of nodes present in the spikes, the second count for each node present in spikes. Details of the properties of spikes are further provided, in FIG. 9 for example, at 904.

At block 1306, a list of spikes may be determined, based on the identified properties of the spikes associated with the representative distribute of the corresponding distribution class of the determined list of distribution classes. The processor 204 may be configured to determine the list of spikes based on the identified properties of the spikes associated with the representative distribute of the corresponding distribution class of the determined list of distribution classes. The list of the spikes may include node-type IDs that may be spikes. Details of the list of spikes are further provided, in FIG. 9 for example, at 906.

At block 1308, properties of the outliers associated with the representative distribute of the corresponding distribution class of the determined list of distribution classes may be identified. The processor 204 may be configured to identify properties of the outliers associated with the representative distribute of the corresponding distribution class of the determined list of distribution classes. The properties of the outliers may be IDs of nodes included in the outliers, node-type of nodes present in the outliers, the second count for each node present in the outliners, and the like. Details of the properties of the outliners are further provided, in FIG. 9 for example, at 908.

At block 1310, a list of outliers may be determined, based on the identified properties of the outliers associated with the representative distribute of the corresponding distribution class of the determined list of distribution classes. The processor 204 may be configured to determine the list of outliers based on the identified properties of the outliers associated with the representative distribute of the corresponding distribution class of the determined list of distribution classes. The list of the outliers may include node-type IDs that may be outliers associated with the representative distribute of the corresponding distribution class. Details of the properties of the list of outliers are further provided, in FIG. 9 for example, at 910.

At block 1312, a distribution of regulars associated with the representative distribute of the corresponding distribution class of the determined list of distribution classes may be identified. The processor 204 may be configured to identify the distribution of regulars associated with the representative distribute of the corresponding distribution class of the determined list of distribution classes. The distribution of regulars associated with the representative distribute may be a portion of the representative distribute that may correspond to the regulars. Details of the distribution of regulars are further provided, in FIG. 10 for example, at 1002.

At block 1314, the identified distribution of the regulars associated with the representative distribute of the corresponding distribution class of the determined list of distribution classes may be sorted into a plurality of buckets. In an embodiment, each of the plurality of buckets may include a bin corresponding to a set of values associated with the set of third nodes (i.e., the nodes corresponding to the regulars) of the representative distribute. As, the regulars may include a combination of large number of nodes with large second counts, in order to store information pertaining to the regulars effectively, the regulars may be split into the plurality of buckets (or bins), for example, of '10' nodes each. Each such bin may include a value associated with each node included in the particular bin. The processor 204 may be configured to sort the identified distribution of the regulars associated with the representative distribute of the corresponding distribution class of the determined list of distribution classes into a plurality of buckets. As, the regulars may include a combination of a large number of nodes with large number of second counts, in order to store information pertaining to the regulars effectively, the regulars may be split into the plurality of buckets, for example, of 10 nodes each. Details of the plurality of buckets are further provided, in FIG. 10 for example, at 1004.

At block 1316, a histogram of the regulars may be determined, based on the plurality of buckets. The processor 204 may be configured to determine the histogram of the regulars, based on the plurality of buckets. The histogram of the regulars may be determined based on the plurality of buckets based on a representation of each of the plurality of buckets on one axis and total number nodes for each bucket along another axis. Details of the distribution of regulars are further provided, in FIG. 10 for example, at 1006. It may be noted that the combined results of steps 1306, 1310 and 1316 may reduce the amount of data that need to be transmitted from the remote site while keeping the faithful reproduction of the graph statistics possible. Control may pass to end.

Although the flowchart 1300 is illustrated as discrete operations, such as 1302, 1304, 1306, 1308, 1310, 1312, 1314, and 1316. However, in certain embodiments, such discrete operations may be further divided into additional operations, combined into fewer operations, or eliminated, depending on the particular implementation without detracting from the essence of the disclosed embodiments.

FIG. 14 is a diagram that illustrates a flowchart of an example method for determination of third statistical information of a retrieved first graph, in accordance with an embodiment of the disclosure. FIG. 14 is described in conjunction with elements from FIG. 1, FIG. 2, FIG. 3, FIG. 4A, FIG. 4B, FIG. 5, FIG. 6A, FIG. 6B, FIG. 7, FIG. 8, FIG. 9, FIG. 10, FIG. 11, FIG. 12 and FIG. 13. With reference to FIG. 14, there is shown a flowchart 1400. The method illustrated in the flowchart 1400 may start at 1402 and may be performed by any suitable system, apparatus, or device such as by the example first electronic device 102 of FIG. 1 or the processor 204 of FIG. 2. Although illustrated with discrete blocks, the steps and operations associated with one or more of the blocks of the flowchart 1400 may be divided into additional blocks, combined into fewer blocks, or eliminated, depending on the particular implementation.

At block 1402, one or more second IDs of the set of IDs of the selected node-type may be determined based on the determined node correlation coefficient of the 2D distributions associated with the identified ID against each of the one or more second IDs, being lesser than the threshold. The processor 204 may be configured to determine the one or more second IDs of the set of IDs of the selected node-type based on the determined node correlation coefficient of the 2D distributions associated with the identified ID against each of the one or more second IDs, being lesser than the threshold. The determined node correlation coefficient of the 2D distributions associated with the identified ID against each of the one or more second IDs may be less than threshold. Hence, each of the one or more second IDs may not be similar or correlated to the identified ID.

At block 1404, a count of the one or more second IDs of the set of IDs of the selected node-type may be determined. The processor 204 may be configured to determine the count of the one or more second IDs of the set of IDs of the selected node-type. The count of the one or more second IDs of the set of IDs of the selected node-type may be the number of second IDs present in the one or more second IDs.

At block 1406, the one or more second IDs of the set of IDs of the selected node-type may be added to a distribution class of a set of distribution classes, based on the determination that the count of the one or more second IDs of the set of IDs of the selected node-type is less than a threshold count. Herein, each of the set of distribution classes may correspond to a set of 2D distributions from the 2D distribution of each of the identified set of edge-types. The processor 204 may be configured to add the one or more second IDs of the set of IDs of the selected node-type to the distribution class of the set of distribution classes based on the determination that the count of the one or more second IDs of the set of IDs of the selected node-type is less than the threshold count. Herein, the threshold count may be used to determine whether the count of one or more second IDs of the set of IDs of the selected node-type is too small. If the count of one or more second IDs of the set of IDs of the selected node-type is lesser than the threshold count, then the one or more second IDs of the set of IDs of the selected node-type may be added to the distribution class including the one or more first IDs of the set of IDs of the selected node-type. However, if the count of one or more second IDs of the set of IDs of the selected node-type is greater than the threshold count, then the identifier (ID) of the selected node-type with the highest count may be reidentified. That is, if the count of one or more second IDs of the set of IDs of the selected node-type is greater than the threshold count, then operations corresponding to blocks 1104 to 1108 (FIG. 11) may be repeated again. The generation of the second graph based on the first graph statistics associated with the retrieved first graph is described further, for example, in FIGS. 15, 16, 17, and 18. Control may pass to end.

Although the flowchart 1400 is illustrated as discrete operations, such as 1402, 1404, and 1406. However, in certain embodiments, such discrete operations may be further divided into additional operations, combined into fewer operations, or eliminated, depending on the particular implementation without detracting from the essence of the disclosed embodiments.

FIG. 15 is a diagram that illustrates a flowchart of an example method for generation of a list of nodes of a second graph to be generated from first graph statistics associated with a retrieved first graph, in accordance with an embodiment of the disclosure. FIG. 15 is described in conjunction with elements from FIG. 1, FIG. 2, FIG. 3, FIG. 4A, FIG. 4B, FIG. 5, FIG. 6A, FIG. 6B, FIG. 7, FIG. 8, FIG. 9, FIG. 10, FIG. 11, FIG. 12, FIG. 13, and FIG. 14. With reference to FIG. 15, there is shown a flowchart 1500. The method illustrated in the flowchart 1500 may start at 1502 and may be performed by any suitable system, apparatus, or device such as by the example second electronic device 104 of FIG. 1 or the processor 304 of FIG. 3. Although illustrated with discrete blocks, the steps and operations associated with one or more of the blocks of the flowchart 1500 may be divided into additional blocks, combined into fewer blocks, or eliminated, depending on the particular implementation.

At block 1502, the determined first statistical information associated with the retrieved first graph may be retrieved from the received first graph statistics associated with the first graph. The processor 304 may be configured to retrieve the determined first statistical information associated with the retrieved first graph from the received first graph statistics associated with the first graph. The determined first statistical information may govern an overall size limit for the generation of the second graph. For example, the determined first statistical information may ensure that a total number of each node-type and a percentage mix amongst all nodes in the generated knowledge graph (such as, the second set of graphs 422 of FIG. 4B) may be same as the original knowledge graph (such as, the first set of graphs 402 of FIG. 4A). Hence, the determined first statistical information associated with the retrieved first graph may be retrieved from the received first graph statistics.

At block 1504, user-input parameters may be received. The processor 304 may be configured to receive user-input parameters from a user, such as, the second user 114. The user-input parameters may include a scaling factor that may ensure an extent of scaling of the retrieved set of first node-types for generation of the second graph (such as, the second set of graphs 422 of FIG. 4B). Thus, to allow for customized generation of the second graph and creation of what-if scenarios, the graph generator 408 may accept user input parameters from a user. The scaling of number of nodes and edges, a proportion of node-type and edge-type, and a ratio of node-types within an edge-type may be knobs that may be controlled so that the generated second graph has the specified characteristics.

At block 1506, a set of first node-types may be retrieved based on the retrieved first statistical information. Herein, a list of nodes associated with the second graph may be generated based on the retrieved set of first node-types and the received user-input parameters. The processor 304 may be configured to retrieve the set of first node-types based on the retrieved first statistical information. Herein, the processor 304 may generate the list of nodes associated with the second graph, based on the retrieved set of first node-types and the received user-input parameters. In order generate the list of nodes associated with the second graph (such as, the second set of graphs 422 of FIG. 4B), the retrieved set of first node-types may be scaled based on the received user-input parameters. In an example, the retrieved first graph may have million nodes and the generated second graph may need to have only thousand nodes for testing purposes. Hence, herein the retrieved set of first node-types including million nodes may be scaled down based on the received user-input parameters. However, if a completely true recreation of the retrieved first graph (such as, the first set of graphs 402 of FIG. 4A) is needed the distribution scaling and scaling of retrieved set of first node-types may not be needed and may be skipped. Control may pass to end.

Although the flowchart 1500 is illustrated as discrete operations, such as 1502, 1504, and 1506. However, in certain embodiments, such discrete operations may be further divided into additional operations, combined into fewer operations, or eliminated, depending on the particular implementation without detracting from the essence of the disclosed embodiments.

FIG. 16 is a diagram that illustrates a flowchart of an example method for generation of a list of scaled edge-distributions of a second graph to be generated from first graph statistics associated with a retrieved first graph, in accordance with an embodiment of the disclosure. FIG. 16 is described in conjunction with elements from FIG. 1, FIG. 2, FIG. 3, FIG. 4A, FIG. 4B, FIG. 5, FIG. 6A, FIG. 6B, FIG. 7, FIG. 8, FIG. 9, FIG. 10, FIG. 11, FIG. 12, FIG. 13, FIG. 14, and FIG. 15. With reference to FIG. 16, there is shown a flowchart 1600. The method illustrated in the flowchart 1600 may start at 1602 and may be performed by any suitable system, apparatus, or device such as by the example second electronic device 104 of FIG. 1 or the processor 304 of FIG. 3. Although illustrated with discrete blocks, the steps and operations associated with one or more of the blocks of the flowchart 1600 may be divided into additional blocks, combined into fewer blocks, or eliminated, depending on the particular implementation.

At block 1602, the determined second statistical information associated with the retrieved first graph may be retrieved from the received first graph statistics associated with the first graph. The processor 304 may be configured to retrieve the determined second statistical information associated with the retrieved first graph from the received first graph statistics associated with the first graph. Though the determined second statistical information may not provide enough details for a truthful reproduction of edges, it may be used for verification of correctness of the generated second graph. Hence, the determined second statistical information associated with the retrieved first graph may be extracted from the received first graph statistics for verification purposes.

At block 1604, a set of 2D distributions associated with edge-types may be reconstructed based on the retrieved second statistical information. Herein, a list of scaled edge-distributions associated with the second graph may be generated based on the reconstructed set of 2D distributions, the generated list of nodes, and the received user-input parameters (received at 1504 of FIG. 15). The processor 304 may be configured to reconstruct the set of 2D distributions associated with edge-types based on the retrieved second statistical information. Herein, the processor 304 may generate the list of scaled edge-distributions associated with the second graph, based on the reconstructed set of 2D distributions, the generated list of nodes, and the received user-input parameters. The set of 2D distributions associated with edge-types may be reconstructed based on the retrieved second statistical information. It may be noted that the retrieved second statistical information associated with the retrieved first graph may include a list of spikes, a list of outliers, a histogram of regulars associated with the determined 2D distributions, based on the which the set of 2D distributions may be reconstructed. Further, the reconstructed set of 2D distributions may be scaled to generate the list of scaled edge-distributions. The scaling of the reconstructed set of 2D distributions may either increase or decrease number of the 2D distributions present in the first the set of 2D distributions based on the received user-input parameters. Control may pass to end.

Although the flowchart 1600 is illustrated as discrete operations, such as 1602 and 1604. However, in certain embodiments, such discrete operations may be further divided into additional operations, combined into fewer operations, or eliminated, depending on the particular implementation without detracting from the essence of the disclosed embodiments.

FIG. 17 is a diagram that illustrates a flowchart of an example method for determination of a set of reconstructed combinations of edge-types of a second graph to be generated from first graph statistics associated with a retrieved first graph, in accordance with an embodiment of the disclosure. FIG. 17 is described in conjunction with elements from FIG. 1, FIG. 2, FIG. 3, FIG. 4A, FIG. 4B, FIG. 5, FIG. 6A, FIG. 6B, FIG. 7, FIG. 8, FIG. 9, FIG. 10, FIG. 11, FIG. 12, FIG. 13, FIG. 14, FIG. 15, and FIG. 16. With reference to FIG. 17, there is shown a flowchart 1700. The method illustrated in the flowchart 1700 may start at 1702 and may be performed by any suitable system, apparatus, or device such as by the example second electronic device 104 of FIG. 1 or the processor 304 of FIG. 3. Although illustrated with discrete blocks, the steps and operations associated with one or more of the blocks of the flowchart 1700 may be divided into additional blocks, combined into fewer blocks, or eliminated, depending on the particular implementation.

At block 1702, the determined third statistical information associated with the retrieved first graph may be retrieved from the received first graph statistics associated with the first graph. The processor 304 may be configured to retrieve the determined third statistical information associated with the retrieved first graph from the received first graph statistics associated with the first graph. As discussed, the determined third statistical information may be associated with the level-3 of retrieved first graph (such as, the first set of graphs 402 of FIG. 4). It may be noted that the determined third statistical information associated with the retrieved first graph may encompass multiple substructures of the retrieved first graph. It may be used to create edges that may join the nodes of the generated list of nodes. Hence, the determined third statistical information associated with the retrieved first graph may be retrieved from the received first graph statistics.

At block 1704, a 3D distribution of each of set of three node-type groups may be reconstructed based on the retrieved third statistical information. Herein, a list of scaled 3D distributions associated with the second graph may be generated based on the reconstructed 3D distribution and the generated list of nodes. The processor 304 may be configured to reconstruct the 3D distribution of each of set of three node-type groups based on the retrieved third statistical information. The processor 304 may generate the list of scaled 3D distributions associated with the second graph, based on the reconstructed 3D distribution and the generated list of nodes. It may be noted that the determined third level statistics may be retrieved as the list of spikes, the list of outliers, and histogram of regulars associated with representative distribute of each distribution class based on the received first graph statistics. Based on the generated list of nodes, the retrieved list of spikes, the retrieved list of outliers, and the retrieved histogram of regulars associated with representative distribute of each distribution class, the representative distribute of each distribution class may be constructed. Further, based on the constructed representative distribute, list of IDs, offset, and range corresponding to each distribution class of the determined list of distribution classes, the 3D distribution corresponding to each distribution class may be reconstructed to determine a list of 3D distributions. The list of scaled 3D distributions may be scaled based on the generated list of nodes to determine the list of scaled 3D distributions.

At block 1706, a set of reconstructed combinations of edge-types connecting each of the set of three node-type groups may be determined from the list of scaled 3D distribution. The processor 304 may be configured to determine the set of reconstructed combinations of edge-types connecting each of the set of three node-type groups from the list of scaled 3D distribution. A given reconstructed combination of edge-type may connect a given three node-type group. Examples of the set of reconstructed combinations of edge-types may be client-merchant-transaction combination, client-item-transaction combination, item-merchant-transaction combination, and the like. Control may pass to end.

Although the flowchart 1700 is illustrated as discrete operations, such as 1702, 1704, and 1706. However, in certain embodiments, such discrete operations may be further divided into additional operations, combined into fewer operations, or eliminated, depending on the particular implementation without detracting from the essence of the disclosed embodiments.

FIG. 18 is a diagram that illustrates a flowchart of an example method for generation of the second set of graphs, in accordance with an embodiment of the disclosure. FIG. 18 is described in conjunction with elements from FIG. 1, FIG. 2, FIG. 3, FIG. 4A, FIG. 4B, FIG. 5, FIG. 6A, FIG. 6B, FIG. 7, FIG. 8, FIG. 9, FIG. 10, FIG. 11, FIG. 12, FIG. 13, FIG. 14, FIG. 15, FIG. 16, and FIG. 17. With reference to FIG. 18, there is shown a flowchart 1800. The method illustrated in the flowchart 1800 may start at 1802 and may be performed by any suitable system, apparatus, or device such as by the example second electronic device 104 of FIG. 1 or the processor 304 of FIG. 3. Although illustrated with discrete blocks, the steps and operations associated with one or more of the blocks of the flowchart 1800 may be divided into additional blocks, combined into fewer blocks, or eliminated, depending on the particular implementation.

At block 1802, a first three node-type group may be selected from the determined set of reconstructed combinations. Herein, the selected first three node-type group may comprise a first node-type, a second node-type, and a third node-type. The processor 304 may be configured to select the first three node-type group from the determined set of reconstructed combinations. In an example, the first node-type may be the client node, the second node-type may be transaction node, and the third node-type may be the merchant node. Thus, the first three node-type may be a client-transaction-merchant combination. In another example, the first node-type may be the client node, the second node-type may be transaction node, and the third node-type may be the item node. The first three node-type may be a client-transaction-item combination. In another example, the first node-type may be the merchant node, the second node-type may be transaction node, and the third node-type may be the item node. The first three node-type may be thus merchant-transaction-item combination.

At block 1804, an iterative execution of a first set of operations 1806 on the selected first three node-type group may be controlled to generate the second set of graphs. The processor 304 may be configured to control the iterative execution of the first set of operations 1806 on the selected first three node-type group to generate the second set of graphs. The first set of operations 1806 may include operations such as, a first operation 1806A, a second operation 1806B, a third operation 1806C, a fourth operation 1806D, and a fifth operation 1806E. The first set of operations 1802 may be iteratively executed by the processor 304. The first set of operations 1806 may be thus iterated through all node-types.

At block 1806A (i.e., the first operation), a first distribution of the first node-type and the second node-type may be determined. The processor 304 may be configured to determine the first distribution of the first node-type and the second node-type. It may be noted that for each pair of connected node-type (for example, client and transaction), all possible three node-type group combinations including the pair may be selected (for example, client-transaction-merchant, client-transaction-item, merchant-transaction-item). The first distribution of the first node-type and the second node-type may be determined from the values of spikes, the values of outliers, and the histograms values. The first distribution may be the 2D distribution between the first node-type and the second node-type. In an example, the first node-type may be the client node, the second node-type may be transaction node, and the third node-type may be the item node. Herein, the first distribution may be the 2D distribution of the client node and the transaction node.

At block 1806B (i.e., the second operation), a second distribution of the first node-type and the third node-type may be determined. The processor 304 may be configured to determine the second distribution of the first node-type and the third node-type. The second distribution may be the 2D distribution between the first node-type and the third node-type. In an example, the first node-type may be the client node, the second node-type may be transaction node, and the third node-type may be the item node. Herein, the second distribution may be the 2D distribution of the client node and the item node.

At block 1806C (i.e., the third operation), a third distribution of the second node-type and the third node-type may be determined. The processor 304 may be configured to determine the third distribution of the second node-type and the third node-type. The third distribution may be the 2D distribution between the second node-type and the third node-type. In an example, the first node-type may be the client node, the second node-type may be transaction node, and the third node-type may be the item node. Herein, the second distribution may be the 2D distribution of the transaction node and the item node.

At block 1806D, edges between nodes associated with the selected first three node-types may be generated, based on the determined first distribution, the determined second distribution, and the received user-input parameters under a constraint associated with the determined third distribution. The processor 304 may be configured to generate edges between nodes associated with the selected first three node-types, based on the determined first distribution, the determined second distribution, and the received user-input parameters under a constraint associated with the determined third distribution. It may be noted that generation of edges of the second graph, at the fourth operation 1806D may be a nested process. An outer loop associated with the fourth operation 1806D may iterate through all node-types and an inner loop associated with the fourth operation 1806D may iterate through all nodes within the node-type associated with a current iteration of the outer loop. As discussed, the edges between the nodes may denote a relationship between the nodes. In order to generate the second graph, the edges between the three node-types of the retrieved set of first node-types may be determined. The fourth operation 1806D may be iterated through a number of nodes in the first three node-types. Thus, the fourth operation 1806D may iterate through each node in the set of first node-types. For example, combinations of edges between client nods or merchant nodes or item nodes may be synthesized according the selected first three node type group for example, client-transaction-merchant or client-transaction-item combination. During the synthesis, a balance of the unselected node-types (for example, merchant nodes and item nodes) may be maintained according to unselected group statistics.

At block 1806E (i.e., the fifth operation), a second three node-type group may be re-selected from the determined set of reconstructed combinations, as the selected first three node-type group. The processor 304 may be configured to re-select the second three node-type group from the determined set of reconstructed combinations as the selected first three node-type group. Herein, the second three node-type group may be different from the first three node-type group. In an example, the second three node-type group may be merchant node, the transaction node, and the item node. Once, the second three node-type is selected the first operation 1806A, the second operation 1806B, the third operation 1806C, the fourth operation 1806D, and the fifth operation 1806E may be executed again for the newly selected second three node type.

At block 1808, the second set of graphs may be generated based on the control of the iterative execution of the first set of operations 1806. The processor 304 may be configured to generate the second set of graphs based on the control of the iterative execution of the first set of operations 1806. The first set of operations may be executed till all combinations of the three node-type groups from the retrieved set of first node-types have been selected. The edges between nodes associated with each three node-types may be combined to generate the second set of graphs (such as, the second set of graphs 422 of FIG. 4B). Control may pass to end.

Although the flowchart 1800 is illustrated as discrete operations, such as 1802, 1804, 1806, and 1808. However, in certain embodiments, such discrete operations may be further divided into additional operations, combined into fewer operations, or eliminated, depending on the particular implementation without detracting from the essence of the disclosed embodiments.

FIG. 19 is a diagram that illustrates a flowchart of an example method for validation of a generated second graph, in accordance with an embodiment of the disclosure. FIG. 19 is described in conjunction with elements from FIG. 1, FIG. 2, FIG. 3, FIG. 4A, FIG. 4B, FIG. 5, FIG. 6A, FIG. 6B, FIG. 7, FIG. 8, FIG. 9, FIG. 10, FIG. 11, FIG. 12, FIG. 13, FIG. 14, FIG. 15, FIG. 17, and FIG. 18. With reference to FIG. 19, there is shown a flowchart 1900. The method illustrated in the flowchart 1900 may start at 1902 and may be performed by any suitable system, apparatus, or device such as by the example second electronic device 104 of FIG. 1 or the processor 304 of FIG. 3. Although illustrated with discrete blocks, the steps and operations associated with one or more of the blocks of the flowchart 1900 may be divided into additional blocks, combined into fewer blocks, or eliminated, depending on the particular implementation.

At block 1902, the generated second graph may be compared with the list of scaled edge-distributions associated with the second graph. The processor 304 may be configured to compare the generated second graph with the list of scaled edge-distributions associated with the second graph. As discussed, the list of scaled edge-distributions associated with the second graph may be generated (at 1604 of FIG. 16), based on the reconstructed set of 2D distributions, the generated list of nodes, and the received user-input parameters. Each of the list of scaled edge-distributions may be compared with the generated second graph (such as, a graph from the second set of graphs 422 of FIG. 4B) to determine whether the list of scaled edge-distributions correspond to (i.e., satisfies) the generated second graph.

At block 1904, the generated second graph may be validated based on the comparison of the generated second graph with the list of scaled edge-distributions associated with the second graph. The processor 304 may be configured to validate the generated second graph based on the comparison of the generated second graph with the list of scaled edge-distributions associated with the second graph. Herein, if the list of scaled edge-distributions corresponds to (i.e., satisfies) the generated second graph then the generated second graph may be validated as successful. In such case, the generated second graph (e.g., a graph from the generated set of graphs 422) may be used to train the predictive model 428. However, if the list of scaled edge-distributions is not satisfied by the generated second graph, then the generated second graph may be an unsuccessful generation and the generated second graph may not be used for training the predictive model 428. Details of the validation of the generated second graph are further provided, for example, in FIG. 20. Control may pass to end.

Although the flowchart 1900 is illustrated as discrete operations, such as 1902 and 1904. However, in certain embodiments, such discrete operations may be further divided into additional operations, combined into fewer operations, or eliminated, depending on the particular implementation without detracting from the essence of the disclosed embodiments.

FIG. 20 is a diagram that illustrates a flowchart of an example method for validation of a generated second graph, in accordance with an embodiment of the disclosure. FIG. 20 is described in conjunction with elements from FIG. 1, FIG. 2, FIG. 3, FIG. 4A, FIG. 4B, FIG. 5, FIG. 6A, FIG. 6B, FIG. 7, FIG. 8, FIG. 9, FIG. 10, FIG. 11, FIG. 12, FIG. 13, FIG. 14, FIG. 15, FIG. 17, FIG. 18 and FIG. 19. With reference to FIG. 20, there is shown a flowchart 2000. The method illustrated in the flowchart 2000 may start at 2002 and may be performed by any suitable system, apparatus, or device such as by the example second electronic device 104 of FIG. 1 or the processor 304 of FIG. 3. Although illustrated with discrete blocks, the steps and operations associated with one or more of the blocks of the flowchart 2000 may be divided into additional blocks, combined into fewer blocks, or eliminated, depending on the particular implementation.

At block 2002, second graph statistics associated with the generated second graph may be extracted. The processor 304 may be configured to extract the second graph statistics associated with the generated second graph. Herein, first statistical information, second statistical information, and third first statistical information associated with the generated second graph may be determined. The first statistical information associated with the generated second graph may include a first count associated with set of first node-types associated with the generated second graph. The second statistical information associated with the generated second graph may include list of scaled edge-distributions associated with second graph. The third statistical information associated with the generated second graph may include set of reconstructed combinations of edge-types connecting each of set of three node-type groups associated with second graph. The extracted second graph statistics may include the first statistical information, the second statistical information, and the third statistical information.

At block 2002, the extracted second graph statistics associated with the generated second graph may be compared with the first graph statistics associated with the first graph. The processor 304 may be configured to compare the extracted second graph statistics associated with the generated second graph with the first graph statistics associated with the first graph. It may be noted that since the first graph statistics may be scaled during the generation of the second graph, the extracted second graph statistics may need to be de-scaled. Otherwise, the comparison of the first graph statistics and the extracted second graph statistics may not be accurate. Alternative, the first graph statistics associated with the retrieved first graph may be scaled to compare against the extracted second graph statistics associated with the generated second graph. However, using de-scaled extracted second graph statistics for comparison may provide another proof-point of invariance of the scaling process and hence, may be executed instead of scaling of the first graph statistics. Herein, the first count of the set of first node-types associated with the generated second graph may de-scaled based on the received user-input parameters. In an embodiment, the first statistical information associated with the generated second graph may be updated to include the de-scaled values of the first count of the set of first node-types. Thereafter, the first statistical information associated with the first graph may be compared with the first statistical information associated with generated second graph (i.e., the de-scaled first count of each of the set of first node-types associated with the generated second graph). Further, the second statistical information associated with the generated second graph including the list of scaled edge-distributions associated with second graph may be de-scaled based on the received user-input parameters. Thereafter, a second count associated with each edge-type of the de-scaled list of the scaled edge-distributions associated with second graph may be compared with the corresponding second count of the identified set of edge-types associated with the retrieved first graph. Further, node-node ratio associated with each edge-type of the de-scaled list of scaled edge-distributions associated with second graph may be compared with the corresponding node-node ratio associated with the edge-type of the identified set of edge-types associated with the retrieved first graph. Further, the third statistical information associated with the generated second graph including the set of reconstructed combinations of edge-types connecting each of set of three node-type groups associated with second graph may be de-scaled based on the received user-input parameters. In other words, a third count of each of set of three node-type groups associated with the generated second graph may be de-scaled. Thereafter, the third statistical information associated with the first graph may be compared with the third statistical information (which may be updated based on the de-scaling) associated with generated second graph. To compare the third statistical information with the first graph with the third statistical information of the second graph, the third count of each of set of three node-type groups associated with the retrieved first graph may be compared with the de-scaled third count of each of set of three node-type groups associated with the generated second graph. Moreover, node to node ratios for each three node-type groups associated with the retrieved first graph may be compared with node to node ratios for each de-scaled three node-type groups associated with the generated second graph. Thus, each node count, edge count, group count, and node-node ratio for each level of the level-1, the level-2, the level-3 may be used as graph-property metrics to determine a successful generation of the second graph at the local site, i.e., the second electronic device 104. Such graph-property metrics may be used as a proxy to a detailed comparison of an actual distribution, as a way to speed up the verification process.

At block 2006, the generated second graph may be validated based on the comparison between the extracted second graph statistics with the first graph statistics. The processor 304 may be configured to validate the generated second graph based on the comparison between the extracted second graph statistics with the first graph statistics. Based on the comparison of the extracted second graph statistics with the first graph statistics the generated second graph may be successful or unsuccessful. In an example, a combined score of all graph-property metrics may be judged against a threshold (for example, 80 percent similarity) to determine the successful generation. Control may pass to end.

Although the flowchart 2000 is illustrated as discrete operations, such as 2002, 2004, and 2006. However, in certain embodiments, such discrete operations may be further divided into additional operations, combined into fewer operations, or eliminated, depending on the particular implementation without detracting from the essence of the disclosed embodiments.

FIG. 21 is a diagram that illustrates a flowchart of an example method for validation of a generated second graph based on comparison between sets of first graph-property metrics, in accordance with an embodiment of the disclosure. FIG. 21 is described in conjunction with elements from FIG. 1, FIG. 2, FIG. 3, FIG. 4A, FIG. 4B, FIG. 5, FIG. 6A, FIG. 6B, FIG. 7, FIG. 8, FIG. 9, FIG. 10, FIG. 11, FIG. 12, FIG. 13, FIG. 14, FIG. 15, FIG. 17, FIG. 18, FIG. 19, and FIG. 20. With reference to FIG. 21, there is shown a flowchart 2100. The method illustrated in the flowchart 2100 may start at 2102 and may be performed by any suitable system, apparatus, or device such as by the example first electronic device 102 of FIG. 1 or the processor 204 of FIG. 3. Although illustrated with discrete blocks, the steps and operations associated with one or more of the blocks of the flowchart 2100 may be divided into additional blocks, combined into fewer blocks, or eliminated, depending on the particular implementation.

At block 2102, a graph-size distribution associated with a splitting of a graph into sub-graphs may be received from the second electronic device 104. The processor 204 may be configured to receive, from the second electronic device 104, the graph-size distribution associated with the splitting of the graph into sub-graphs. Herein, the graph-distribution may be received based on a user input or automatically from the second electronic device 104. The graph-distribution may be used to divide a graph into sub-graphs. Size of sub-graphs may be based on the graph-distribution.

At block 2104, a set of first sub-graphs may be extracted from the retrieved first graph based on the received graph-size distribution. The processor 204 may be configured to extract the set of first sub-graphs from the retrieved first graph, based on the received graph-size distribution. In an example, one sub-graph may be extracted based on a selection of one node from one node-type of the identified set of node-types and a determination of a one hop neighbor and the edge-type connecting the corresponding node to the corresponding one hop neighbor. The process may be repeated for each node of each of the identified set of node-types associated with the retrieved first graph. Therefore, if there are billions of node-types, then millions of sub-graphs may be extracted based the aforesaid technique. If the sub-graphs are randomly chosen from the millions of the set of first sub-graphs for comparison, then the comparison may be inefficient. Hence, the millions of the set of first sub-graphs may be sorted based on a certain sub-graph metrics, such as, graph density.

At block 2106, a set of second sub-graphs associated with the generated second graph may be received from the second electronic device 104. Herein, the set of second sub-graphs may be generated by the second electronic device 104 based on the graph-size distribution. The processor 204 may be configured to receive the set of second sub-graphs associated with the generated second graph from the second electronic device (such as, the second electronic device 104). Similar to the set of first sub-graphs, each of the set of second sub-graphs may be generated by the second electronic device 104 based on a selection of one node form one node-type of set of node-types associated with the generated second graph and based on a determination of the one hop neighbor and the edge-type connecting the corresponding node to the corresponding one hop neighbor. The process may be repeated for each node of each of the set of node-types associated with the generated second graph.

At block 2108, a set of first graph-property metrices may be determined based on the extracted set of first sub-graphs. The processor 204 may be configured to determine the set of first graph-property metrices based on the extracted set of first sub-graphs. The set of first graph-property metrices may be associated with the extracted set of first sub-graphs. The first graph-property metrices for each first sub-graph may be determined. Examples of the first graph-property metrices are provided at 2110.

At block 2110, a set of second graph-property metrices may be determined based on the received set of second sub-graphs. The processor 204 may be configured to determine the set of second graph-property metrices based on the received set of second sub-graphs. Herein, values of the second graph-property metrices for each second sub-graph may be determined. The first graph-property metrices may be similar to the second graph-property metrices so that fair comparison of the set of first sub-graphs and the received set of second sub-graphs may be done.

In an embodiment, each of the determined set of first graph-property metrices and the determined set of second graph-property metrices may include at least one of, but not limited to, a graph density, a graph radius, a percentage distribution of different node-types to a total number of nodes, a percentage distribution of different edge types to a total number of edges, or a number of cycles in a graph. The graph density may be number of edges over number of nodes. In an embodiment, the graph density may be determined based on a ratio of the graph size to a height of the graph. Herein, the graph size may be a total number of nodes in the graph and the height of the graph may be defined as a maximum number edges from a leaf node to a root node. The graph radius may be defined as a minimum eccentricity among all vertices of the graph. Herein, the eccentricity of a vertex may be a maximum distance from a vertex to any other vertex of the graph. The percentage distribution of different node-types to the total number of nodes may indicate a percentage of a number of nodes of given node-type is from the total number of nodes. The percentage a given edge type may be determined based on a ratio of a number of given edge type to the total number of edges. The number of cycles in the graph may be a number of closed chains present in the graph. Herein, for each cycle some nodes may be connected in a closed chain. Each of the determined set of first graph-property metrices and the determined set of second graph-property metrices may be extended or changed as deemed appropriate for an actual deployment.

At block 2112, the determined set of first graph-property metrices may be compared with the determined set of second graph-property metrices. The processor 204 may be configured to compare the determined set of first graph-property metrices with the determined set of second graph-property metrices. For example, the graph density, the graph radius, and the number of cycles associated with the determined set of first graph-property metrices may be compared with the graph density, the graph radius, and the number of cycles associated with the determined set of second graph-property metrices, respectively.

At block 2114, the generated second graph may be validated based on the comparison between the determined set of first graph-property metrics and the determined set of second graph-property metrics. The processor 204 may be configured to validate the generated second graph, based on the comparison between the determined set of first graph-property metrics and the determined set of second graph-property metrics. The comparison between the determined set of first graph-property metrics and the determined set of second graph-property metrics may validate the low-level detailed structure of the generated second graph, with respect to the first graph. Herein, based on the comparison of each of the determined set of first graph-property metrics with the corresponding second graph-property metrics, a set of scores may be determined, such that a higher match between each of the determined set of first graph-property metrics with the corresponding second graph-property metrics may correspond to a higher score. Each of the set of scores may be combined. The combined score may be compared against a threshold (for example, 80 percentage similarity) to determine the successful generation. Control may pass to end.

Although the flowchart 2100 is illustrated as discrete operations, such as 2102, 2104, 2106, 2108, 2110, 2112, and 2114. However, in certain embodiments, such discrete operations may be further divided into additional operations, combined into fewer operations, or eliminated, depending on the particular implementation without detracting from the essence of the disclosed embodiments.

FIG. 22 is a diagram that illustrates a flowchart of an example method for generation of a prediction output based on a predictive model determined based on an application of graph machine learning on a generated second graph, in accordance with an embodiment of the disclosure. FIG. 22 is described in conjunction with elements from FIG. 1, FIG. 2, FIG. 3, FIG. 4A, FIG. 4B, FIG. 5, FIG. 6A, FIG. 6B, FIG. 7, FIG. 8, FIG. 9, FIG. 10, FIG. 11, FIG. 12, FIG. 13, FIG. 14, FIG. 15, FIG. 17, FIG. 18, FIG. 19, FIG. 20, and FIG. 21. With reference to FIG. 22, there is shown a flowchart 2200. The method illustrated in the flowchart 2200 may start at 2202 and may be performed by any suitable system, apparatus, or device such as by the example second electronic device 104 of FIG. 1 or the processor 304 of FIG. 3. Although illustrated with discrete blocks, the steps and operations associated with one or more of the blocks of the flowchart 2200 may be divided into additional blocks, combined into fewer blocks, or eliminated, depending on the particular implementation.

At block 2202, a predictive model associated with the generated second graph may be received from the second electronic device 104. Herein, the received predictive model 428 may be generated by the second electronic device 104, based on an application of the graph machine learning model 306A on the generated second set of graphs 422. The processor 204 may be configured to receive the predictive model 428 associated with the generated second set of graphs 422 from the second electronic device 104. It may be noted that the predictive model (such as, the predictive model 428 of FIGS. 4A and 4B) may predict outcome of events based on outcomes of past events. Examples of the predictive model may include a classification model, a clustering model, a forecast model, a regression model, and the like.

At block 2204, the received predictive model may be applied on the retrieved first graph. The processor 204 may be configured to apply the received prediction model (e.g., the predictive model 428) on the retrieved first set of graphs 402. The retrieved first set of graphs 402 may not be anonymized and attributes associated with the retrieved first set of graphs 402 may not be removed. The retrieved first set of graphs 402 may be provided as an input to the received predictive model 428 for prediction operation.

At block 2206, a prediction output associated with the retrieved first graph may be generated based on the application of the received prediction model on the retrieved first graph. The processor 204 may be configured to generate the prediction output associated with the retrieved first graph based on the application of the received prediction model 428 on the retrieved first set of graphs 402. Since, the received predictive model 428 may be trained for prediction, the prediction output (such as, the predictions 436) may be generated by the received predictive model 428 based on the retrieved first set of graphs 402, provided as the input. Control may pass to end.

Although the flowchart 2200 is illustrated as discrete operations, such as 2202, 2204, and 2206. However, in certain embodiments, such discrete operations may be further divided into additional operations, combined into fewer operations, or eliminated, depending on the particular implementation without detracting from the essence of the disclosed embodiments.

Traditional methods for secure data mobility such as, data masking may be used to create an alternate version of data from which personal identifiable information may not be deduced. However, such techniques may neither reduce an amount of information that may be required to be transferred nor help in data augmentation. Moreover, a laxity of enforcement of data security policies for external IT partners for generation of machine learning model may vary. Thus, the machine learning models that may be generated by the external IT partners, based on such shared data may lack accuracy or robustness. On the other hand, the disclosed first electronic device 102 may provide data privacy for a customer at a remote site by only capturing anonymized metadata. The first electronic device 102 may efficiently capture data at the remote site with a statistical method. The disclosed second electronic device 104 may generate truthful reproduction of customer knowledge graphs called as the second graph at a local site, which may be suitable for machine learning (such as, using graph neural networks (GNNs)). A predictive model may be generated based on the training of the GNN at the local site and transmitted to the remote site for predictions. Moreover, graph data such as, the first graph statistics may be native to handle variations in graph topology and graph properties. Furthermore, parameterized metadata may allow creation of custom and what-if scenarios in the generated second graph. Same metadata, such as, the second graph statistics may be extracted from generated second graph and compared against original metadata, such as the first graph statistics, for validation of truthful graph recreation. Thus, the privacy of data may be maintained by anonymization of the graph data before transmission at the remote site, and accurate reproduction based on graph statistics at the local site. As, the generated graph may be validated at the local site prior to the training of the GNN, the predictive model build based on the generated graph at the local site may be highly accurate.

The present disclosure may be applied in various scenarios, such as, but not limited to, banking, financial transactions, and credit card issuer, where transactions and relationships between entities that may be private, and entities may not be willing to share such data. Moreover, the present disclosure may be applied to medical records in healthcare, where compliance and governance may place a strictly limit on what data may be disclosed and so working on simulated data may be an alternative. Further, the present disclosure may be applied to data reduction for e-commerce or social network, where volume of relational data may be too large to handle. Thus, statistical extraction such as, the first statistical information, the second statistical information, and the third statistical information, may allow data to be recreated in various sizes and mixes for machine learning. The present disclosure may be further applied to education and children privacy, wherein working on simulated data may eliminate worries about a child's personally identifiable information. Herein, the first electronic device 102 may build and analyze relational data for remote and online learning more effectively.

Various embodiments of the disclosure may provide one or more non-transitory computer-readable storage media configured to store instructions that, in response to being executed, cause a system (such as, the example first electronic device 102) to perform operations. The operations may include retrieving a first graph from a graph database. The operations may include obtaining a schema associated with the retrieved first graph. The operations may include identifying a set of node-types associated with the retrieved first graph based on the obtained schema. The operations may include determining a first count of each of the identified set of node-types. The operations may further include determining first statistical information associated with the retrieved first graph, based on the determined first count. The operations may include identifying a set of edge-types associated with the retrieved first graph, based on the obtained schema. The operations may further include determining a second count of each of the identified set of edge-types. The operations may further include determining a two-dimensional (2D) distribution of each of the identified set of edge-types, based on the identified set of edge-types and the identified set of node-types. The operations may further include determining second statistical information associated with the retrieved first graph, based on the determined second count and the determined 2D distribution. The operations may further include identifying a set of combinations of edge-types connecting three node-types from the retrieved first graph, based on the obtained schema. The operations may further include determining a third count of each of a set of three node-type groups from the retrieved first graph, based on the identified set of combinations. The operations may further include determining a three-dimensional (3D) distribution of each of the set of three node-type groups, based on the determined third count and the identified set of combinations. The operations may further include determining third statistical information associated with the retrieved first graph, based on the determined third count and the determined 3D distribution. The operations may further include transmitting, to a second electronic device, first graph statistics associated with the retrieved first graph, the transmitted first graph statistics includes the determined first statistical information, the determined second statistical information, and the determined third statistical information. Herein, a second graph representative of the retrieved first graph may be generated by the second electronic device based on the transmitted first graph statistics.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, executed by a processor in a first electronic device, comprising:

retrieving a first graph from a graph database;

obtaining a schema associated with the retrieved first graph;

identifying a set of node-types associated with the retrieved first graph based on the obtained schema;

determining a first count of each of the identified set of node-types;

determining first statistical information associated with the retrieved first graph, based on the determined first count;

identifying a set of edge-types associated with the retrieved first graph, based on the obtained schema;

determining a second count of each of the identified set of edge-types;

determining a two-dimensional (2D) distribution of each of the identified set of edge-types, based on the identified set of edge-types and the identified set of node-types;

determining second statistical information associated with the retrieved first graph, based on the determined second count and the determined 2D distribution;

identifying a set of combinations of edge-types connecting three node-types from the retrieved first graph, based on the obtained schema;

determining a third count of each of a set of three node-type groups from the retrieved first graph, based on the identified set of combinations;

determining a three-dimensional (3D) distribution of each of the set of three node-type groups, based on the determined third count and the identified set of combinations;

determining third statistical information associated with the retrieved first graph, based on the determined third count and the determined 3D distribution; and transmitting, to a second electronic device, first graph statistics associated with the retrieved first graph, the transmitted first graph statistics includes the determined first statistical information, the determined second statistical information, and the determined third statistical information, wherein a second graph representative of the retrieved first graph is generated by the second electronic device based on the transmitted first graph statistics.

2. The method according to claim 1, wherein the retrieved first graph corresponds to at least one of: a banking entity, financial transactions, a credit card issuer entity, medical records associated with a healthcare entity, an e-commerce domain, a social networking domain, an education domain, or personally identifiable information associated with children.

3. The method according to claim 1, further comprising:

dividing the determined 2D distributions into spikes, outliers, and regulars, wherein the spikes correspond to a set of first nodes of the retrieved first graph, such that a number of the set of first nodes is below a first threshold and the determined second count corresponding to the set of first nodes is above a second threshold, the outliers correspond to a set of second nodes of the retrieved first graph, such that a number of the set of second nodes is above a third threshold and the determined second count corresponding to the set of second nodes is below a fourth threshold, and the regulars correspond to a set of third nodes of the retrieved first graph, such that the set of third nodes includes nodes other than the set of first nodes and the set of second nodes of the retrieved first graph;

identifying properties of the spikes;

determining a list of the spikes based on the identified properties of the spikes;

identifying properties of the outliers; and determining a list of the outliers based on the identified properties of the outliers.

4. The method according to claim 3, wherein the retrieved first graph corresponds to at least one of: a banking entity, financial transactions, or a credit card issuer entity, the spikes correspond to a set of first transactions with an amount greater than the second threshold such that a number of the set of first transactions is below than the first threshold, the outliers correspond to a set of second transactions with an amount less than the fourth threshold such that a number of the set of second transactions is greater than the third threshold, and the regulars correspond to transactions other than the set of first transactions and the set of second transactions in the retrieved first graph such that a total amount of the regular transactions correspond to a statistically significant contribution to the second score.

5. The method according to claim 3, further comprising:

identifying a distribution of the regulars;

sorting the identified distribution of the regulars into a plurality of buckets, wherein each of the plurality of buckets includes a bin corresponding to a set of values associated with the set of third nodes of the retrieved first graph; and determining a histogram of the regulars based on the plurality of buckets.

6. The method according to claim 5, wherein the retrieved first graph corresponds to at least one of: a banking entity, financial transactions, or a credit card issuer entity, and the plurality of buckets corresponds to at least one of: a type of transacting entity, a type of a financial transaction, or a value of a financial transaction.

7. The method according to claim 1, further comprising:

selecting a node-type from the identified set of node-types;

identifying an identifier (ID) of the selected node-type with a highest count;

determining node correlation coefficients of the identified ID of the selected node-type against a set of IDs of the selected node-type; and comparing the determined node correlation coefficients of the identified ID of the selected node-type against the set of IDs of the selected node-type, with a threshold.

8. The method according to claim 7, further comprising:

adding one or more first IDs of the set of IDs of the selected node-type to a distribution class of a set of distribution classes based on the node correlation coefficient of the identified ID against each of the one or more first IDs being greater than the threshold, wherein each of the set of distribution classes corresponds to a set of 2D distributions from the 2D distribution of each of the identified set of edge-types;

determining an offset and a range of each node in the set of 2D distributions of each distribution class of the set of distribution classes;

normalizing and averaging the set of 2D distributions of each distribution class; and determining a list of distribution classes from the set of distribution classes, based on the normalizing and the averaging, wherein each distribution class of the determined list of distribution classes corresponds to a representative distribute, a list of IDs, the offset, and the range.

9. The method according to claim 8, further comprising:

dividing the representative distribute of each distribution class of the determined list of distribution classes into spikes, outliers, and regulars, wherein the spikes correspond to a set of first nodes of the representative distribute, such that a number of the set of first nodes is below a first threshold and the determined second count corresponding to the set of first nodes is above a second threshold, the outliers correspond to a set of second nodes of the representative distribute, such that a number of the set of second nodes is above a third threshold and the determined second count corresponding to the set of second nodes is below a fourth threshold, and the regulars correspond to a set of third nodes of the representative distribute, such that the set of third nodes includes nodes other than the set of first nodes and the set of second nodes of the representative distribute;

identifying properties of the spikes associated with the representative distribute of the corresponding distribution class of the determined list of distribution classes;

determining a list of the spikes based on the identified properties of the spikes associated with the representative distribute of the corresponding distribution class of the determined list of distribution classes;

identifying properties of the outliers associated with the representative distribute of the corresponding distribution class of the determined list of distribution classes;

determining a list of the outliers based on the identified properties of the outliers associated with the representative distribute of the corresponding distribution class of the determined list of distribution classes;

identifying a distribution of the regulars associated with the representative distribute of the corresponding distribution class of the determined list of distribution classes;

sorting the identified distribution of the regulars associated with the representative distribute of the corresponding distribution class of the determined list of distribution classes into a plurality of buckets, wherein each of the plurality of buckets includes a bin corresponding to a set of values associated with the set of third nodes of the representative distribute; and determining a histogram of the regulars based on the plurality of buckets.

10. The method according to claim 7, further comprising:

determining one or more second IDs of the set of IDs of the selected node-type based on the determined node correlation coefficient of the identified ID against each of the one or more second IDs, being lesser than the threshold;

determining a count of the one or more second IDs of the set of IDs of the selected node-type; and adding the one or more second IDs of the set of IDs of the selected node-type to a distribution class of a set of distribution classes based on the determination that the count of the one or more second IDs of the set of IDs of the selected node-type is less than a threshold count, wherein each of the set of distribution classes corresponds to a set of 2D distributions from the 2D distribution of each of the identified set of edge-types.

11. The method according to claim 1, wherein the generation of the second graph by the second electronic device comprises:

retrieving the determined first statistical information associated with the retrieved first graph from the received first graph statistics associated with the first graph;

receiving user-input parameters; and retrieving a set of first node-types based on the retrieved first statistical information, wherein a list of nodes associated with the second graph is generated based on the retrieved set of first node-types and the received user-input parameters.

12. The method according to claim 11, further comprising:

retrieving the determined second statistical information associated with the retrieved first graph from the received first graph statistics associated with the first graph; and reconstructing a set of 2D distributions associated with edge-types based on the retrieved second statistical information, wherein a list of scaled edge-distributions associated with the second graph is generated based on the reconstructed set of 2D distributions, the generated list of nodes, and the received user-input parameters.

13. The method according to claim 12, further comprising:

retrieving the determined third statistical information associated with the retrieved first graph from the received first graph statistics associated with the first graph;

reconstructing a 3D distribution of each of set of three node-type groups based on the retrieved third statistical information, wherein a list of scaled 3D distributions associated with the second graph is generated based on the reconstructed 3D distribution and the generated list of nodes; and determining a set of reconstructed combinations of edge-types connecting each of the set of three node-type groups from the list of scaled 3D distribution.

14. The method according to claim 13, further comprising:

selecting a first three node-type group from the determined set of reconstructed combinations, wherein the selected first three node-type group comprises a first node-type, a second node-type, and a third node-type;

controlling an iterative execution of a first set of operations on the selected first three node-type group to generate the second graph, wherein the first set of operations include:

determining a first distribution of the first node-type and the second node-type, determining a second distribution of the first node-type and the third node-type, determining a third distribution of the second node-type and the third node-type, generating edges between nodes associated with the selected first three node-types based on the determined first distribution, the determined second distribution, and the received user-input parameters under a constraint associated with the determined third distribution, and re-selecting a second three node-type group from the determined set of reconstructed combinations, as the selected first three node-type group; and generating the second graph based on the control of the iterative execution of the first set of operations.

15. The method according to claim 14, further comprising:

comparing the generated second graph with the list of scaled edge-distributions associated with the second graph; and validating the generated second graph based on the comparison of the generated second graph with the list of scaled edge-distributions associated with the second graph.

16. The method according to claim 14, further comprising:

extracting second graph statistics associated with the generated second graph;

comparing the extracted second graph statistics associated with the generated second graph with the first graph statistics associated with the first graph; and validating the generated second graph based on the comparison between the extracted second graph statistics with the first graph statistics.

17. The method according to claim 1, further comprising:

receiving, from the second electronic device, a graph-size distribution associated with a splitting of a graph into sub-graphs;

extracting, from the retrieved first graph, a set of first sub-graphs based on the received graph-size distribution;

receiving, from the second electronic device, a set of second sub-graphs associated with the generated second graph, wherein the set of second sub-graphs are generated by the second electronic device based on the graph-size distribution;

determining a set of first graph-property metrices based on the extracted set of first sub-graphs;

determining a set of second graph-property metrices based on the received set of second sub-graphs;

comparing the determined set of first graph-property metrices with the determined set of second graph-property metrices; and validating the generated second graph, based on the comparison between the determined set of first graph-property metrics and the determined set of second graph-property metrics.

18. The method according to claim 17, wherein the each of the determined set of first graph-property metrices and the determined set of second graph-property metrices includes at least one of: a graph density, a graph radius, a percentage distribution of different node-types to a total number of nodes, a percentage distribution of different edge types to a total number of edges, or a number of cycles in a graph.

19. The method according to claim 1, further comprising:

receiving, from the second electronic device, a predictive model associated with the generated second graph, wherein the received predictive model is generated by the second electronic device, based on an application of a graph machine learning model on the generated second graph;

applying the received prediction model on the retrieved first graph; and generating a prediction output associated with the retrieved first graph, based on the application of the received prediction model on the retrieved first graph.

20. The method according to claim 1, wherein the identified set of node-types corresponds to at least one of: a customer node-type, a merchant node-type, a transaction node-type, or an item node-type, and wherein the identified set of edge-types comprises an amount edge-type.

21. One or more non-transitory computer-readable storage media configured to store instructions that, in response to being executed, cause a first electronic device to perform operations, the operations comprising:

retrieving a first graph from a graph database;

obtaining a schema associated with the retrieved first graph;

identifying a set of node-types associated with the retrieved first graph based on the obtained schema;

determining a first count of each of the identified set of node-types;

determining first statistical information associated with the retrieved first graph, based on the determined first count;

identifying a set of edge-types associated with the retrieved first graph, based on the obtained schema;

determining a second count of each of the identified set of edge-types;

determining a two-dimensional (2D) distribution of each of the identified set of edge-types, based on the identified set of edge-types and the identified set of node-types;

determining second statistical information associated with the retrieved first graph, based on the determined second count and the determined 2D distribution;

identifying a set of combinations of edge-types connecting three node-types from the retrieved first graph, based on the obtained schema;

determining a third count of each of a set of three node-type groups from the retrieved first graph, based on the identified set of combinations;

determining a three-dimensional (3D) distribution of each of the set of three node-type groups, based on the determined third count and the identified set of combinations;

determining third statistical information associated with the retrieved first graph, based on the determined third count and the determined 3D distribution; and transmitting, to a second electronic device, first graph statistics associated with the retrieved first graph, the transmitted first graph statistics includes the determined first statistical information, the determined second statistical information, and the determined third statistical information, wherein a second graph representative of the retrieved first graph is generated by the second electronic device based on the transmitted first graph statistics.

22. An electronic device, comprising:

a memory storing instructions; and a processor, coupled to the memory, that executes the stored instructions to perform a process comprising:

retrieving a first graph from a graph database;

obtaining a schema associated with the retrieved first graph;

identifying a set of node-types associated with the retrieved first graph based on the obtained schema;

determining a first count of each of the identified set of node-types;

determining first statistical information associated with the retrieved first graph, based on the determined first count;

identifying a set of edge-types associated with the retrieved first graph, based on the obtained schema;

determining a second count of each of the identified set of edge-types;

determining a two-dimensional (2D) distribution of each of the identified set of edge-types, based on the identified set of edge-types and the identified set of node-types;

determining second statistical information associated with the retrieved first graph, based on the determined second count and the determined 2D distribution;

identifying a set of combinations of edge-types connecting three node-types from the retrieved first graph, based on the obtained schema;

determining a third count of each of a set of three node-type groups from the retrieved first graph, based on the identified set of combinations;

determining a three-dimensional (3D) distribution of each of the set of three node-type groups, based on the determined third count and the identified set of combinations;

determining third statistical information associated with the retrieved first graph, based on the determined third count and the determined 3D distribution; and transmitting, to a second electronic device, first graph statistics associated with the retrieved first graph, the transmitted first graph statistics includes the determined first statistical information, the determined second statistical information, and the determined third statistical information, wherein a second graph representative of the retrieved first graph is generated by the second electronic device based on the transmitted first graph statistics.

* * * * *